United States Patent
Gelphman

[19]
[11] Patent Number: 5,920,735
[45] Date of Patent: *Jul. 6, 1999

[54] METHOD AND APPARATUS TO OBSERVE THE GEOMETRY OF RELATIVE MOTION

[76] Inventor: Janet L. Gelphman, 3308 Duchess Trail, Dallas County, Dallas, Tex. 75229

[*] Notice: This patent issued on a continued prosecution application filed under 37 CFR 1.53(d), and is subject to the twenty year patent term provisions of 35 U.S.C. 154(a)(2).

[21] Appl. No.: 08/784,349

[22] Filed: Jan. 16, 1997

[51] Int. Cl.[6] .................................................. G03B 17/24
[52] U.S. Cl. ............................ 396/24; 396/428; 396/429
[58] Field of Search ............................... 396/24, 20, 661, 396/419, 428, 429

[56] References Cited

U.S. PATENT DOCUMENTS

| | | |
|---|---|---|
| 369,165 | 8/1887 | Connon . |
| 2,590,389 | 3/1952 | Doyle .......................................... 95/86 |
| 3,183,810 | 5/1965 | Campbell ..................................... 95/16 |
| 3,437,753 | 4/1969 | Stith ....................................... 178/7.81 |
| 3,559,552 | 2/1971 | Weitzer .................................... 178/7.1 |
| 3,620,148 | 11/1971 | La Rocco .................................... 95/15 |
| 3,820,134 | 6/1974 | Wilton et al. .............................. 354/81 |
| 3,862,424 | 1/1975 | Abel et al. ............................... 250/349 |
| 3,891,301 | 6/1975 | Heller ........................................ 350/85 |
| 3,992,707 | 11/1976 | Schmidtlein et al. ....................... 343/5 |
| 4,103,160 | 7/1978 | Moss ........................................ 250/334 |
| 4,147,419 | 4/1979 | Boyan ........................................ 354/66 |
| 4,199,819 | 4/1980 | Schwee et al. ............................ 365/87 |
| 4,209,248 | 6/1980 | Gibson et al. ............................. 355/8 |
| 4,241,985 | 12/1980 | Globus et al. ............................. 354/99 |
| 4,312,676 | 1/1982 | Hogseth et al. ......................... 106/189 |
| 4,320,415 | 3/1982 | Jones ....................................... 358/105 |
| 4,348,097 | 9/1982 | Sippel ...................................... 354/293 |
| 4,515,455 | 5/1985 | Northmore ............................... 354/293 |
| 4,577,827 | 3/1986 | Eliscu ....................................... 248/656 |
| 4,752,791 | 6/1988 | Allred ........................................ 354/81 |
| 4,764,015 | 8/1988 | Bieringer et al. ........................ 356/372 |
| 4,808,822 | 2/1989 | Manning et al. ......................... 250/332 |
| 4,811,410 | 3/1989 | Amir et al. ................................. 382/8 |
| 4,837,431 | 6/1989 | Malinowski ............................. 250/235 |
| 4,868,768 | 9/1989 | Draggoo .................................. 364/525 |

(List continued on next page.)

OTHER PUBLICATIONS

Pp. 73–77 Remote Sensing and Image Interpretation, Lillesand (1981).
Pp. 110–113, Surveillant Science–Remote Sensing of the Environment, by Holz.
Gelphman, Knezek, Horn, The Topological Panorama Camera: A New Tool for Teaching Concepts Related to Space and Time, *Journal of Computers in Mathematics and Science Teaching*, pp. 19–29 vol. 11, No. 1 (1992).
Topocam Brochure The Gelphman Camera Company, Jun. 1993.

*Primary Examiner*—David M. Gray
*Attorney, Agent, or Firm*—Anderson, Levine & Lintel, L.L.P.

[57] ABSTRACT

A topological panorama camera has a track or other system upon which a linescan camera can move in one, two or three dimensions while recording the image of an object. The path, speed, acceleration and direction of the linescan camera can be controlled, as can the path, speed, acceleration and direction of the object. Further, the scan rate of the camera and the orientation of the scan can be controlled. These factors allow the user to record an image of an object which change many of the properties of the object. The relative motion of the linescan camera and the object allows a student to create images which change properties of an object from one geometry to another.

77 Claims, 14 Drawing Sheets

U.S. PATENT DOCUMENTS

| | | | |
|---|---|---|---|
| 4,875,779 | 10/1989 | Luebbe et al. | 356/394 |
| 4,899,061 | 2/1990 | Van Hoek et al. | 250/560 |
| 4,929,845 | 5/1990 | Amir et al. | 250/561 |
| 4,935,629 | 6/1990 | Livermore et al. | 250/349 |
| 4,943,821 | 7/1990 | Gelphman et al. | 396/24 |
| 4,965,665 | 10/1990 | Amir | 358/101 |
| 4,975,714 | 12/1990 | Rose | 346/1.1 |
| 4,983,827 | 1/1991 | Ikegaya et al. | 250/235 |
| 4,996,434 | 2/1991 | Tanaka | 250/492.3 |
| 5,055,683 | 10/1991 | McCracken | 250/334 |
| 5,085,320 | 2/1992 | Rose | 346/108 |
| 5,085,746 | 2/1992 | Musselman et al. | 204/129.4 |
| 5,097,516 | 3/1992 | Amir | 382/1 |
| 5,101,442 | 3/1992 | Amir | 382/41 |
| 5,118,194 | 6/1992 | Mather et al. | 356/426 |
| 5,127,061 | 6/1992 | Amir et al. | 382/1 |
| 5,164,595 | 11/1992 | Musselman et al. | 250/306 |
| 5,247,170 | 9/1993 | Cardew | 250/227.13 |
| 5,279,309 | 1/1994 | Taylor et al. | 128/782 |
| 5,363,901 | 11/1994 | Bjornestol et al. | 164/451 |
| 5,375,175 | 12/1994 | Kino et al. | 382/8 |
| 5,402,801 | 4/1995 | Taylor | 128/898 |
| 5,445,166 | 8/1995 | Taylor | 128/897 |
| 5,475,797 | 12/1995 | Glaspy, Jr. et al. | 395/82 |

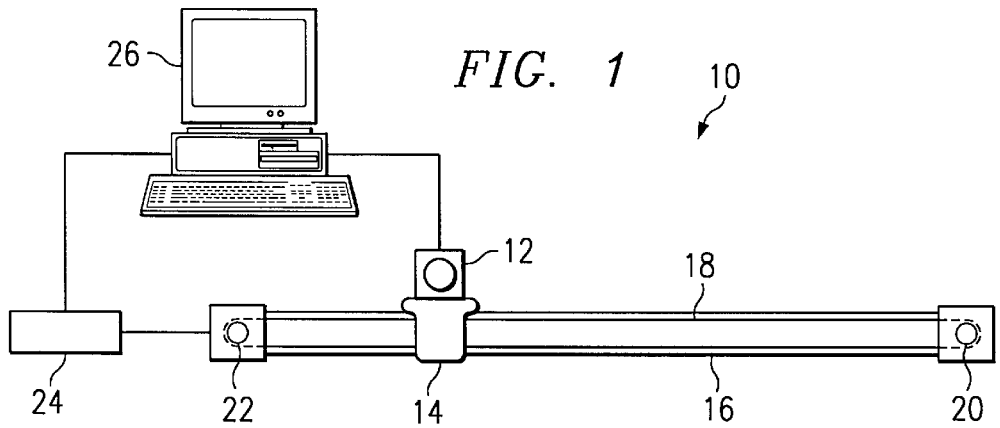
FIG. 1
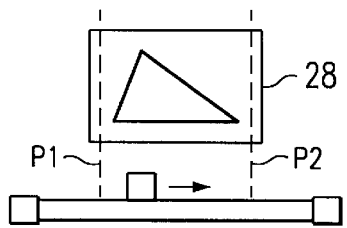
FIG. 2a
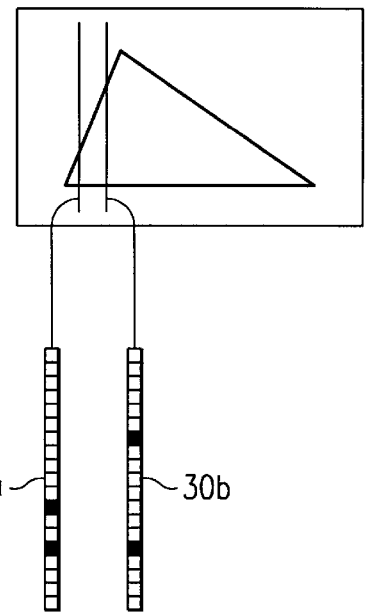
FIG. 2b
```
SEGMENT:
STARTING POSITION OF SCAN:
SEGMENT LENGTH:
CARRIAGE DIRECTION:
CARRIAGE SPEED:
CARRIAGE ACCELERATION:
SCAN DIRECTION:
SCAN RATE:
SCAN RATE ACCELERATION:
OVERLAP:
LENS MAGNIFICATION:
EXPOSURE CONTROL:
```
FIG. 3
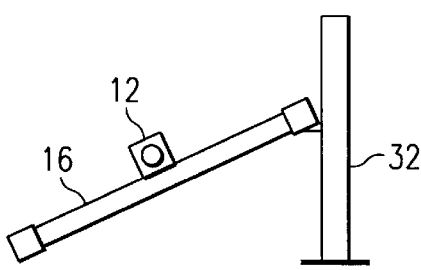
FIG. 4
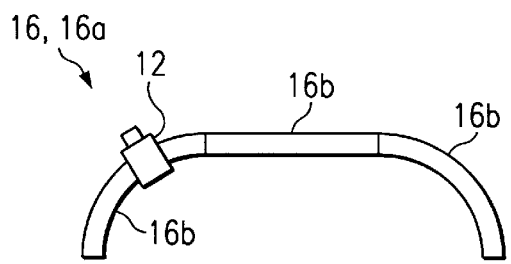
FIG. 5

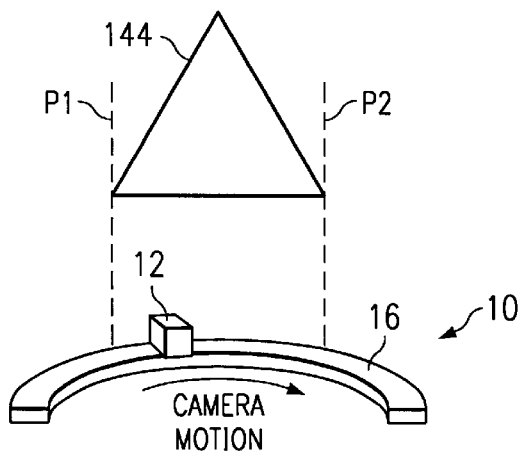
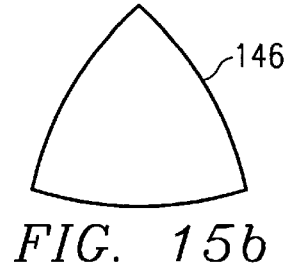
FIG. 15b
FIG. 15a
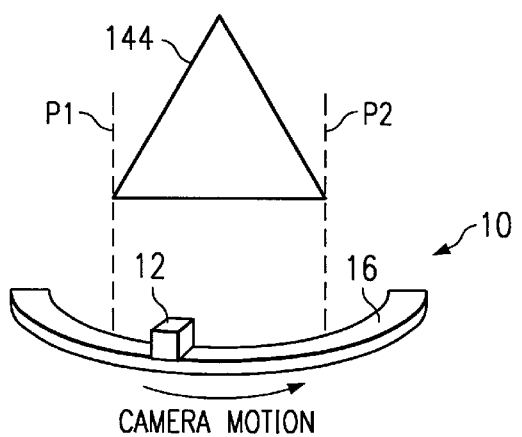
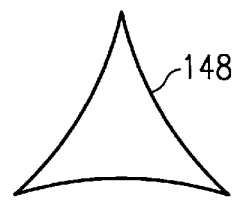
FIG. 16b
FIG. 16a
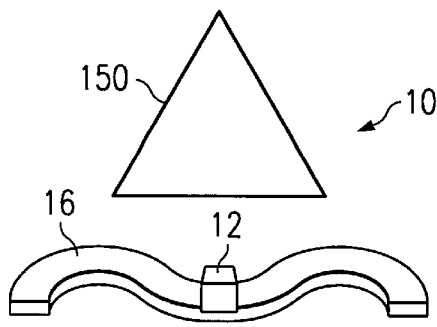
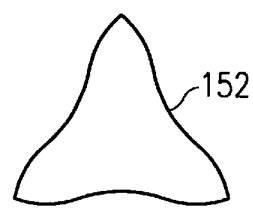
FIG. 17b
FIG. 17a

METHOD AND APPARATUS TO OBSERVE THE GEOMETRY OF RELATIVE MOTION

BACKGROUND OF THE INVENTION

1. Technical Field

This invention relates in general to imaging and, more particularly, to a topological panoramic camera.

2. Description of the Related Art

Many educational studies over the last several years have found science an math education sorely lacking in this country. American students are out performed by counterparts in other countries. Many articles have revealed that American students are lacking inquiry based, hands-on math manipulations that would enhance the learning or mathematics and science.

Many years ago, Seymour Papert developed a method to create a computational geometry with a computer and a programming language for children called LOGO. The programming language allows children to program a cybernetic screen robot, called a "Turtle", to create desired geometric shapes. With this method, children intuitively learn geometric relationships and concepts.

For example, to create a square with the screen turtle, a child might write the following program:

```
TO SQUARE
FORWARD 100
RIGHT 90 (degrees)
FORWARD 100
RIGHT 90
FORWARD 100
RIGHT 90
FORWARD 100
RIGHT 90
END
```

While LOGO allows students to create and manipulate shapes, it does not provide for a method to create images for visualizing motion or spacetime. The ability for visualizing relative motion between objects is an important concept in many fields including mathematics, chemistry, physics and engineering.

Therefore, a need has arisen for a method and apparatus for creating geometry to further enhance the mathematical and scientific education of students.

SUMMARY OF THE INVENTION

The present invention provides a method of teaching mathematical and scientific concepts through experimentation with images. The student is provided with an object having a known shape. A desired shape is identified and a prospective image of said desired shape is generated by moving an image recorder, such as a linescan camera, relative to the object in a predetermined path while recording an image.

The present invention allows a student to see concepts which are otherwise not describable in an image form, and to experiment with relative motion to generate shapes from one geometry into another geometry.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates a first embodiment of a topological panorama camera;

FIG. 2a and 2b illustrate the process of recording images using the topological panorama camera;

FIG. 3 illustrates a interface to set user defined variables in controlling the topological panorama camera;

FIG. 4 illustrates a second embodiment of a topological panorama camera;

FIG. 5 illustrates a third embodiment of a topological panorama camera;

FIGS. 15a and 15b illustrate a method of generating a non-Euclidean shape from a Euclidean shape;

FIGS. 16a and 16b illustrate a method of generating a non-Euclidean shape from a Euclidean shape;

FIGS. 17a and 17b illustrate a method of generating a topological shape from a Euclidean shape;

FIGS. 31a, 32b, and 32c illustrate the use of the topological panorama camera to visualize the frequency of sound;

DETAILED DESCRIPTION OF THE PREFERRED EMBODIMENT

Figure 6:
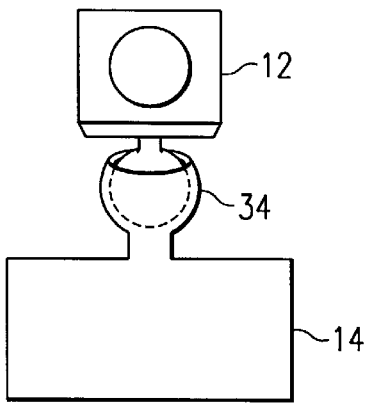
FIG. 6 illustrates an alternative embodiment for mounting the linescan camera portion of the topological panorama camera.

The present invention is best understood in relation to FIGS. 1–35 of the drawings, like numerals being used for like elements of the various drawings.

FIG. 1 illustrates a first embodiment of a topological panorama camera 10. The topological panorama camera 10 comprises a scanning camera 12 coupled to carriage 14. Carriage 14 is slidably engaged on track 16. Belt 18 is coupled to carriage 14 to drive the carriage 14 in either direction along the track 16. One end of belt 18 is disposed about rotor 20. The other end of belt 18 is driven by step motor 22. Motor 22 is coupled to controller 24. Controller 24 is coupled to a serial port of computer 26. The computer 26 is also connected to scanning camera 12 through an interface card.

The motor 22 and the controller 24 are available from AMERICAN PRECISION INDUSTRIES, INC. of Buffalo, N.Y.

Linescan cameras are available from a number of sources, such as EG&G RETICON, which produces a linescan camera having a vertical linear array of light sensitive charge coupled devices which is one pixel wide by 1024 pixels long. This linescan camera can sample lines of light from a scene at a user defined rate of up to 35,000 lines/sec. While the high resolution and scan rate of this camera can produce a sharp image, lesser specifications would also be acceptable.

Linescan cameras are useful for recording the image because they are commercially available. However, any image recorder which can be configured to image a line of energy, typically light (hereinafter, a "line sensing image recorder") could be used in the topological panorama camera 10, including cameras which use a matrix of CCD or other photosensitive devices, so long as the matrix could be electrically or mechanically configured to provide a line through which light from the object is received and sent to computer 26. Film-based cameras could also be used, although the cost and time in developing film is a problem in many situations. While normally a line sensing image recorder receives visible light, other spectrums could also be detected, such as infra-red, ultra-violet, x-rays and so on. Further, a line sensing image recorder could image other energy fields such as magnetic fields.

Since the output of the linescan camera is typically an analog signal, the computer 26 uses an interface card, such as one sold by GIRARD ELECTRONICS of Gray, Tenn. to digitize and store the information. This card converts the camera video signal into an eight-bit/pixel digital form (i.e., a 256 grayscale image). The interface board has a double line memory buffer which enables maximum processing speeds. After a line of video signal is acquired in the card's first memory location, the next line is directed to the second memory location. The first line of video information is then processed and transferred to the host computer memory while the second line is being acquired. After acquiring the second line into the interface card, the video signal is directed to the first memory buffer location as the second line is processed and transferred to the host computer. The process continues by alternating the memory locations for receiving and processing until the image is complete. The architecture allows a continuous image to be formed with minimal memory requirements. While the interface card discussed above is a grayscale memory card, a color interface card could be used in conjunction with a color linescan camera as well.

In operation, the user programs desired criteria into computer 26 to define a path for scanning camera 12 along carriage 14. The scanning camera 12 is typically a linescan camera which has a column of CCD (charge coupled device) cells, where the CCD cells generate a charge corresponding to the amount of light received by the cells. The line of CCD cells operates as an optical slit as discussed in U.S. Pat. No. 4,943,821. For each line scan, the scanning camera outputs information to the computer 26. The computer 26 receives the information for each line scan and stores the information along with information from previous line scans to form an image.

A simple example of a scan operation is shown in FIGS. 2a and 2b, where the scanning camera 12 travels a path from a first point (P1) on the carriage to a second point (P2) on the carriage at a predetermined velocity (preferably, the carriage 14 is accelerated up to the desired velocity prior to reaching P1 and decelerates to a stop after P2). An object 28 is placed in front of the camera 12 along the path. In the example shown in FIG. 2a, the object 28 is a flat surface with a drawing of a triangle. As the linescan camera 12 travels along the path, it receives light through its lens, which is received by the CCD. At predetermined intervals, the image from the linescan camera 12 is output to the computer. The image from the linescan camera 12 is a narrow line of the overall object 28, as shown by the example images 30a and 30b, shown in FIG. 2b. The image is digitized (if the output of the linescan camera 12 is analog) by the interface card. The computer 26 then forms an overall image by arranging each image from the linescan camera 12 in a file on the computer.

FIG. 3 illustrates a number of variables which can be selected by the user to control the path of the linescan camera 12 and to control how the overall image is formed in the computer 26. The segment field allows the user to provide different variables for multiple segments. Accordingly, a scan path can have different segments with different motion properties. The multiple segment ability also allows a complex path to be broken into multiple paths which are simpler to program.

The starting position of the scan is the position at which the computer 26 begins receiving images (after the ramp-up acceleration) from the linescan camera 12 to form the overall image. This variable could be set as a measurement from the either extreme of the track, in inches or millimeters.

The segment length is the distance the linescan camera 12 travels in forming the overall image and could also be set in inches or millimeters. The carriage direction is the direction (right or left) in which the linescan camera will initially travel from the starting position. Alternatively, the segment could be defined as a starting position and an ending position, rather than by starting position, length and direction.

The carriage speed specifies the initial speed of the linescan camera 12, i.e., the speed of the camera at the starting point and could be set in term of inches/sec or millimeters/sec. The carriage acceleration defines an acceleration for the linescan camera 12 and could be set in terms of inches/sec$^2$ or millimeters/sec$^2$. For a constant velocity, the acceleration would be equal to zero throughout the segment. The carriage acceleration allows the speed of the linescan camera to increase or decrease during the segment scan.

The scan direction defines how the images from the linescan camera are arranged by the computer 26 to form the overall image. This is similar to the direction of the film advance in a film based panoramic camera. The scan rate defines how often image lines from the linescan camera 12 are sent to the computer 26 to form the overall image, and could be set in terms of image lines/sec. The scan rate acceleration allows the scan rate to change during the segment and could be set in terms of image lines/sec$^2$. A non-linear scan rate acceleration profile could also be programmed.

The overlap setting is one method to create an image which either overwrites a previous image or to adds to a previous image. In other words, if the overlap setting is set to "overwrite", the scan will result in a new image. If the overlap setting is set to "add" the new image will be combined with a previous image, similar to a multiple exposure in a film based camera. However, in the case of a computer image, the new information received from the linescan camera 12 will be combined with existing information through averaging to produce the new image.

The Lens Magnification setting is available if the linescan camera 12 has a zoom lens. The Exposure Control setting is used to set the exposure for the linescan camera.

FIGS. 4 and 5 illustrate embodiments of the topological panorama camera 10 which provide greater flexibility in track configuration. In FIG. 4, an embodiment is shown where a side to support 32 is used support one end of the track in order to dispose the track 16 at an angle.

In FIG. 5, a curved track 16a is formed of interlocking pieces 16b to define a curved, or partially curved, path for the linescan camera 12. Interlocking pieces could be provided similar to those shown in U.S. Pat. No. 4,943,821 to Gelphman, issued Jul. 24, 1990, which is incorporated by reference herein. Using a track 16 with different shaped track parts 16b would allow paths which had both curved and straight portions to create geometries described in greater detail hereinbelow. In this embodiment, the drive mechanism would more likely be incorporated into the carriage 14 rather than the track 16.

FIG. 6 illustrates a further possible modification to the carriage 14, which would allow the linescan camera 12 to be set at any angle through a joint 34 which allows tilt, pitch and roll, or a subset of these three degrees of freedom. The setting of the linescan camera angle could be performed manually, using a simple joint, or under computer control using a robotic joint. Using a robotic joint would allow the linescan camera angle to be changed during a scanning operation.

Figure 7:
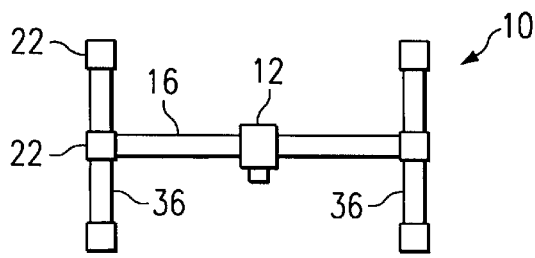
FIG. 7 illustrates a fourth embodiment of a topological panorama camera.

FIG. 7 illustrates an embodiment of the topological panorama camera 10 where the track 16 is supported by a second track 36, which allows the computer 26 to drive the track 16 forward and backward. Hence, the computer 26 can set a two dimensional path for the camera. Track 36 operates essentially the same as track 16, with the computer 26 controlling a second motor 22 associated with track 36 through controller 24.

Figure 8:
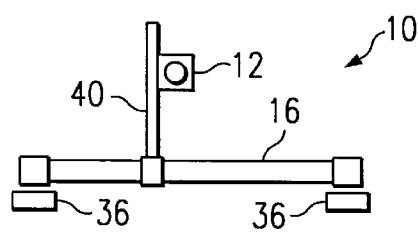
FIG. 8 illustrates a fifth embodiment of a topological panorama camera.

FIG. 8 illustrates an embodiment of the topological panorama camera 10 where a full three dimensional path can be realized. In this embodiment, a third track 40, which is vertically aligned, is disposed between track 16 and carriage 14. The third track provides vertical motion to the linescan camera 12 under control of the computer 26.

Figure 9:
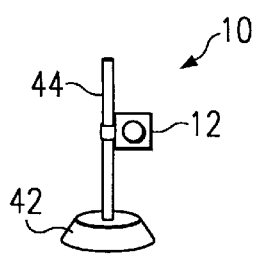
FIG. 9 illustrates a sixth embodiment of a topological panorama camera 10.

FIG. 9 illustrates an alternative embodiment of a topological panorama camera 10 with the capability to provide three dimensional paths for the line scan camera 12. This embodiment uses a robotic base 42 which can move in two dimensions over a flat surface, such as a floor or a table. An elevator 44 is disposed on the robotic base 42 to raise and lower the linescan camera 12. The computer 26 can control the robotic base 42, elevator 44 and linescan camera 12 through either a wired or a wireless connection. Alternatively, the computer 26 can be built into the robotic base.

The three dimensional topological panorama camera 10 of FIG. 9 is not constrained by the dimensions of tracks 16 and 36 as shown in FIGS. 7 and 8. Therefore, this embodiment can provide paths of any length, and also provide paths encircling an object, which would not be possible with the topological panorama cameras 10 of FIGS. 7 and 8. This embodiment could also use a robotic joint to mount the linescan camera 12 as described in connection with FIG. 6.

In addition to the path of a scan, the image is also affected by the movement of the object. Accordingly, mechanisms similar to those described for movement of the linescan camera 12 could be used to move the object of the scan as well. Other methods of movement of the object, such as setting the object on a turntable or swinging as a pendulum could also be employed.

The topological panorama camera 10 records images of an object through a line, i.e. the CCD linear array, which continuously moves relative to an object. As a result, the images of an object may be quite different from the human perception of the object, which is a momentary, three dimensional perspective perception of space and time.

One use for the topological panorama camera 10 is in education. An important way in which the topological panorama camera 10 can be used to enhance a students knowledge of geometry is to use the topological panorama camera 10 to create shapes or predict a shape.

Figure 10:
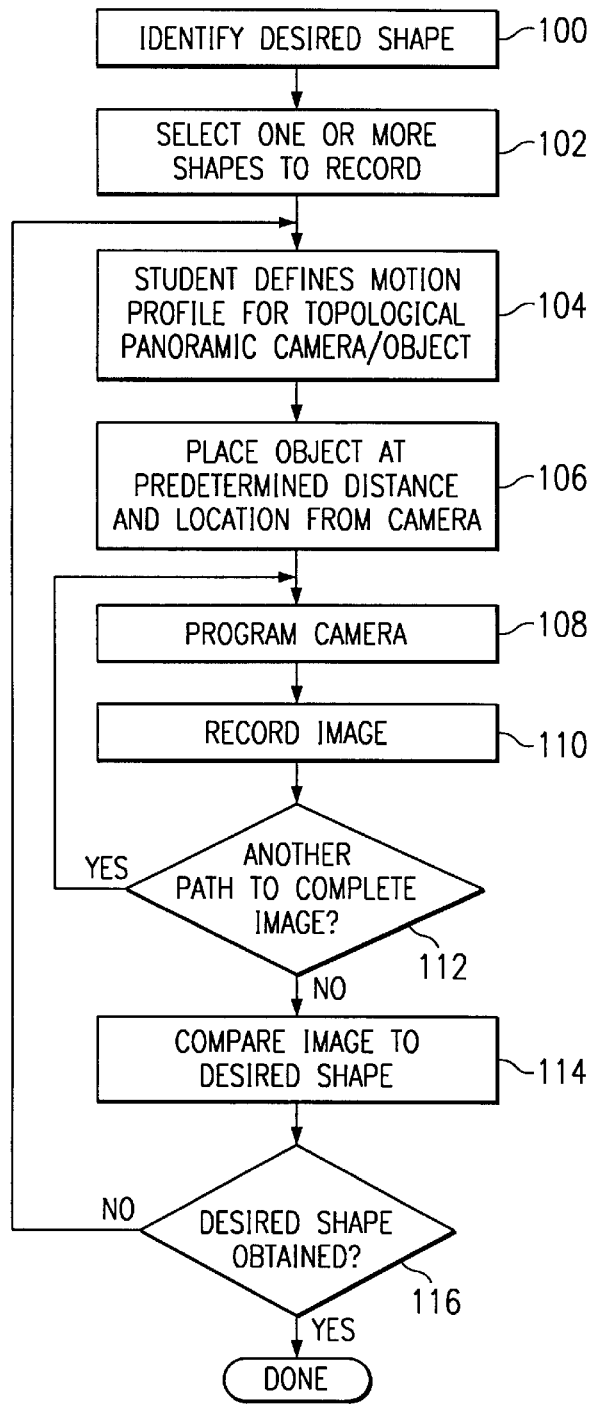
FIG. 10 illustrates a flow chart describing a method for using the topological panorama camera to enhance learning of geometry.

FIG. 10 illustrates a flow chart describing a method for teaching in which a student generates a desired shape by making an image of a predetermined object (for example, a piece of cardboard with a square drawn on it, a ball, or a ruler) using the topological panorama camera 10 to record an image using one or more scans.

In step 100, the desired shape is identified. As an example, the teacher may choose an equilateral triangle as the desired shape. In step 102, one or more objects are selected for use in making an image displaying the desired shape. For instance, a piece of cardboard with a straight line could be used to make the image of the equilateral triangle (the desired shape).

In step 104, the student determines a motion profile of the relative movements between the object and the camera needed to produce the image of the desired shape. The motion profile for the topological panorama camera 10 may include a combination of: (1) starting position, (2) length of scan operation, (3) carriage direction, (4) carriage speed, (5) carriage acceleration (linear and non-linear), (6) scan direction, (7) scan rate and (8) scan rate acceleration (linear and non-linear). Similarly, the position, movement speed, direction, and acceleration of the object can be considered.

Once the motion profile is determined, the object is placed in front of the topological panorama camera 10 at a predetermined location in step 106 and the camera is programmed for a first path in step 108. The image is then recorded in step 110; if an object motion is being used, the object is placed in motion and synchronized with the topological panorama camera 10 prior to starting the image. After recording, if additional paths are necessary to complete the image of the desired shape in decision block 112, steps 108 and 110 are repeated; otherwise, the resulting image is compared to the desired shape in block 114.

If the desired shape is obtained in decision block 116, then the assignment is done. Otherwise, the student rethinks the motion profile and begins the recording process again.

By predicting the outcome of a motion profile and comparing it with the actual result, a student enhances his problem solving abilities, spatial visualization, critical thinking skills, capabilities to analyze new knowledge and new information, and creative and divergent thinking skills. Even when a student incorrectly predicts a motion profile for generating the desired shape, discovering why the predicted motion profile resulted in a different-than-expected image is instructive in itself.

Below, a number of examples describing how the topological panorama camera 10 can be used to create different shapes are set forth.

Creating a Euclidean Geometry

Figure 11A:
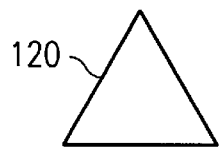
FIGS. 11a through 11f illustrate an example of the method of FIG. 10 using a line segment to generate an image of a triangle.
Figure 11B:
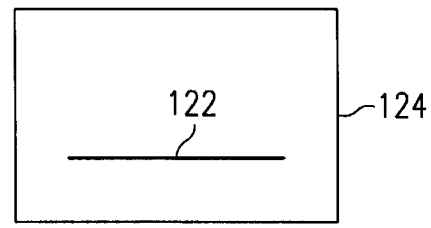
Figure 11C:
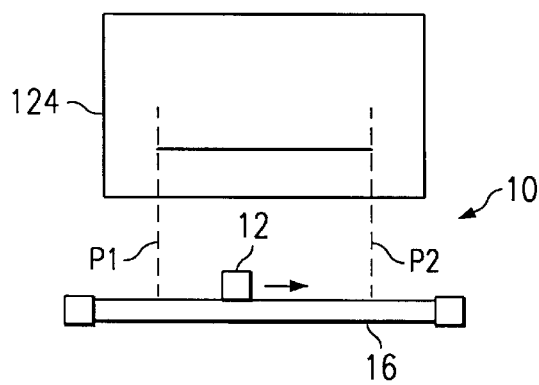

FIGS. 11a–f illustrate a first method of creating a triangle (the desired shape) with a line segment (the selected shape). FIG. 11a illustrates the desired shape 120, an equilateral triangle. FIG. 11b illustrates the selected shape 122, a line segment, drawn on a sheet of material 124. In FIG. 11c, the linescan camera 12 scans the selected shape in a scan path defined by P1 and P2, at a predetermined constant speed and predetermined constant scan rate, with the scan direction the same as the carriage direction.

Figure 11D:
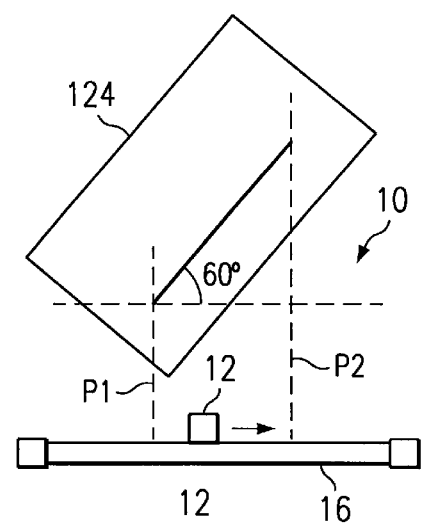

In FIG. 11d, the object 124 is rotated sixty degrees and a second scan path is defined (with the overlap setting set to "add") using the same settings as in FIG. 11c, although the distance of the scan would be shorter, as shown by points P1 and P2 in FIG. 11d.

Figure 11E:
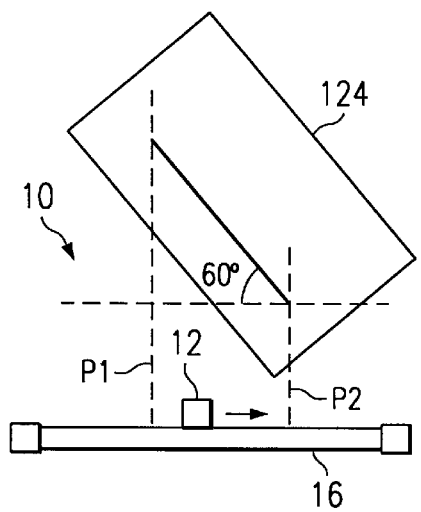
Figure 11F:
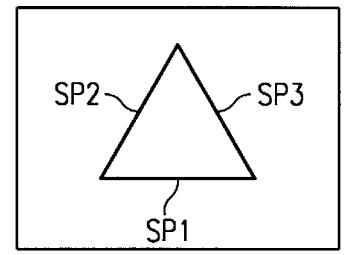

In FIG. 11e, the object is rotated such that line segment 122 lies sixty degrees from parallel, in the opposite direction from that of FIG. 11d. A third scan is made with the same settings as those in FIG. 11d.

The resultant equilateral triangle is formed by the scan path desct SP1 was formed by the scan path described in conjunction with FIG. 11c, segment SP2 was formed by the scan path described in conjunction with FIG. 11d, and segment SP3 was formed by the scan path described in conjunction with FIG. 11e.

Figure 12A:
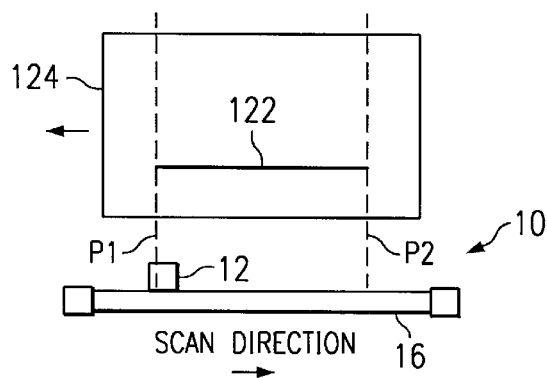
FIGS. 12a through 12d illustrate a second example of the method of FIG. 10 using a line segment to generate an image of a triangle.

FIG. 12a–d illustrate a second method which could be used to generate an image of an equilateral triangle 120 from a line segment 122. The first scan path used to form the triangle is shown in FIG. 12a. Rather than move the camera 12, as shown in FIG. 11c, the object is moved to the left at a predetermined constant speed with the linescan camera 12 still.

Figure 12B:
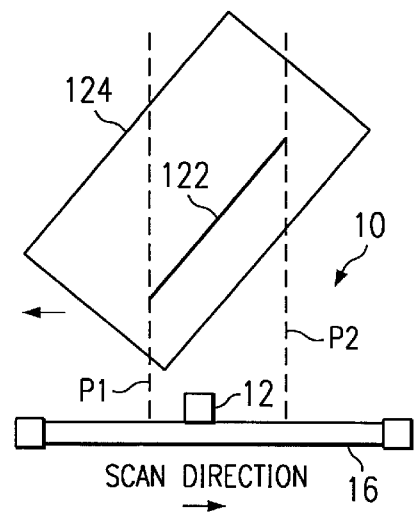
Figure 12C:
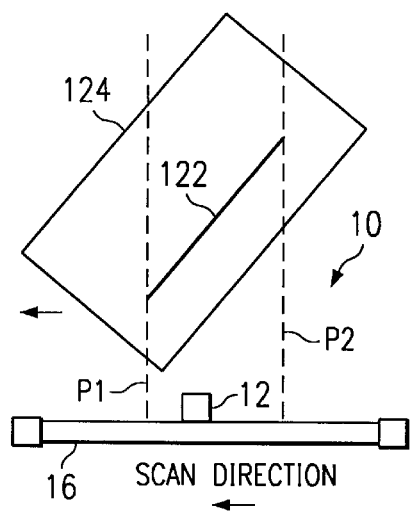

In FIG. 12b, the card is turned sixty degrees and a second scan path is made by moving the card to the left with the linescan camera still. In FIG. 12c, the same scan path as in FIG. 12b is used, moving the object 124 to the left; however, in this case the scan direction (the order in which scan lines are arranged to form an image) is reversed. An alternative method to form the final line segment would be to move the object 124 to the right while maintaining the scan direction in the same direction as in FIG. 12b.

Figure 12D:
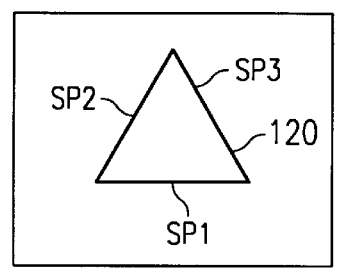

The resultant image is shown in FIG. 12d.

FIGS. 13a–e illustrate another example of creating a geometric shape, where a selected shape, a right triangle 130 drawn on a flat object 132 (shown in FIG. 13a), is used to create a similar triangle 134 (shown in FIG. 13b) being rotated by 90 degrees. Right triangle 130 has three angles, A, B and C. The desired shape also has angles substantially equal to A, B, and C (labeled A', B' and C', respectively). The problem is to use the topological panorama camera 10 to generate the desired shape 134 without rotating either the object 132 or the topological panorama camera 10.

Figure 13A:
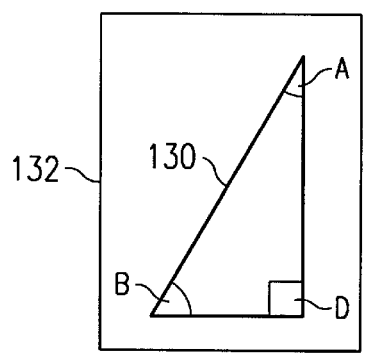
FIG. 13a through 13e illustrate an example of the method of FIG. 10 to generate a congruent right angle.
Figure 13B:
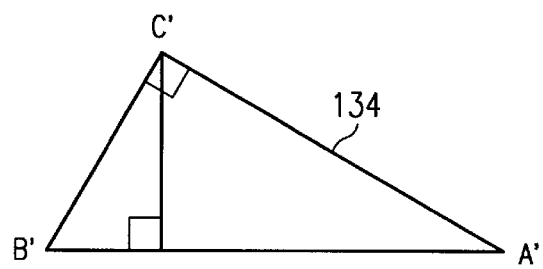
Figure 13C:
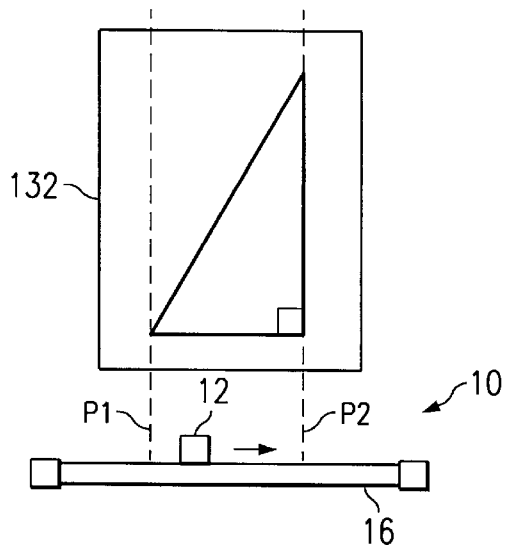
Figure 13D:
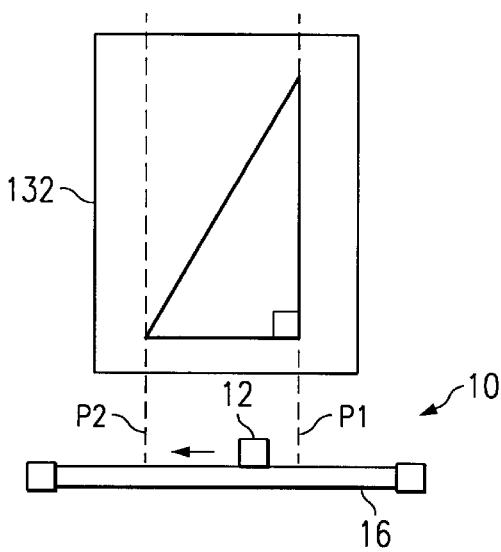
Figure 13E:
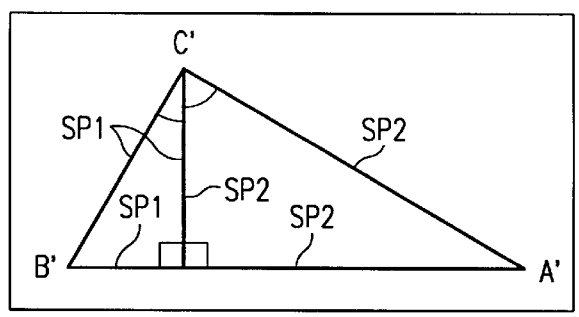

The solution is shown in FIGS. 13c–e. In FIG. 13c, a path from P1 to P2 is defined at a predetermined carriage velocity, for example 10 inches/sec. After completing this scan path, a reverse scan path is defined (as shown by the opposite orientation of P1 and P2 in FIGS. 13c and 13d) at a slower speed, for example 2.2 inches/second.

As shown in FIG. 13e, the resulting image comprises two triangles mated along a common side. The first triangle SP1, resulting from the first scan path, is essentially the same as the sample shape. This is a result of choosing a carriage speed and scan rate which does not horizontally stretch or compress the object. The second triangle SP2, resulting from the second scan path, is a stretched mirror image of the sample shape 130. Triangle SP2 is horizontally stretched because of the slower carriage speed and is a mirror image because the direction of the linescan camera 12 is reversed during the second scan path relative to the first scan path.

The examples shown in FIGS. 11–13 describe creating a geometry which follows the rules of a Euclidean Geometry. Using the topological panorama camera 10, an image that follows the rules for a Euclidean geometry is created when the camera moves relative to an object in a plane that is parallel or at an angle to an object. For example, a shape, such as a triangle, which is imaged in a scan path which is in a plane parallel or at an angle to the linescan camera 12 will retain some of the properties of a Euclidean space. For example, the angles of the imaged triangle will always add up to 180 degrees (as shown in FIGS. 13a–e). Changes in the image shape due to changes in speed, direction or distance from the camera, preserve the Euclidean perspective displayed in the geometry of the created image.

Creating a Non-Euclidean Geometry

A non-Euclidean geometry is generated when the linescan camera moves in a predetermined path of a hyperbolic curve (a constant negative curvature) or a spherical curve (a constant positive curve). All images created in this manner follow the postulates of a non-Euclidean geometry. For example, in FIG. 15a, the linescan camera 12 is mounted on a spherically curved track 15. The object 144, an equilateral triangle, lies on a plane in front of the track. The resulting image is a spherical triangle 146, which has the sum of its angles greater than 180 degrees. Conversely, if the relative movement between the linescan camera and the object 144 is on a constant negative curvature as shown in FIG. 16a, the image would be that of a hyperbolic triangle 148, shown in FIG. 16b, which has angles with a sum of less than 180 degrees.

Using the topological panorama camera 10, a student can create a non-Euclidean shape from a Euclidean shape, such as a line segment (using a process similar to that shown in FIGS. 11a–f or FIGS. 12a–e) or closed object such as a triangle or square.

Creating a Topological Geometry

Another type of geometry which can be created using relative motion with the topological panorama camera 10 is a topological geometry. Traditional study of topology studies the homeomorphism—the spatial equivalences other than those of size and shape, as described in *A Child's Conception of Space*, Piaget and Inhelder (1948). Such a geometry does not distinguish between circles, ellipses, or polygons, nor between cubes and spheres, but between, for example, a sphere and a torus.

A topological geometry is created by a predetermined motion when the linescan camera 12 moves in a "topological motion", traveling in any continuous path in motion or space relative to an object. This produces a continuous deformation of the object in the resultant image. For example, in FIG. 17, equilateral triangle 150 is deformed into image 152 when the scanning device travels in a path of a one dimensional manifold. A similar result would occur if the line scan camera traveled with non-linear acceleration.

Method to Change the Extrinsic Geometry of an Object Through Relative Motion

Figure 18A:
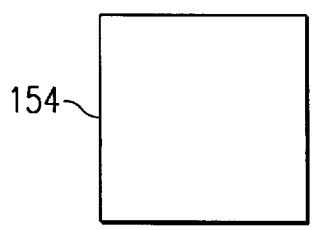
FIGS. 18a and 18b demonstrate the difference between extrinsic and intrinsic properties of an object.
Figure 18B:
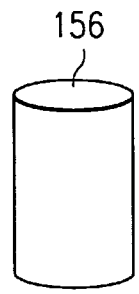

FIG. 18 illustrates an important aspect of geometry, the differentiation of intrinsic and extrinsic properties. FIG. 18a illustrates a flat piece of paper. When rolled into a cylinder 156, as shown in FIG. 18b, the extrinsic property of the shape has changed—the paper is now embedded in three dimensional space. However, the intrinsic properties of the paper, its internal structure, has not deformed.

Figure 19A:
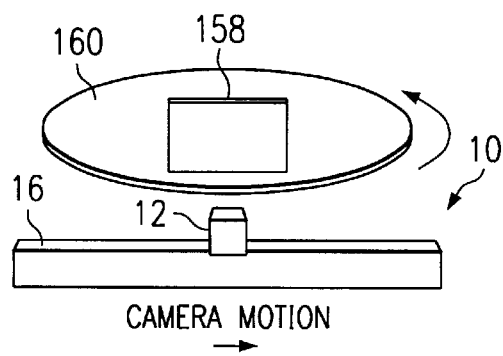
FIGS. 19a, 19b and 19c illustrate a method to change the extrinsic property of an object through relative motion.
Figure 19B:
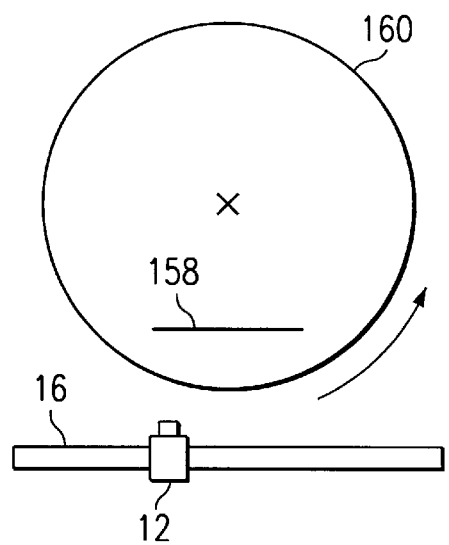
Figure 19C:
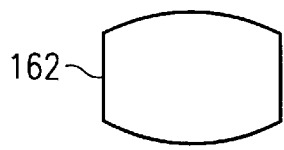

The topological panorama camera 10 can be used to derive images which change the extrinsic properties of an object, while not changing the intrinsic properties. FIGS. 19a–b illustrate front and top views of an object 158, a flat rectangular object located on the edge of a rotating turntable 160. As the turntable rotates, an image is recorded using a topological panorama camera 10 having a straight track 16. The turntable is synchronized with the linescan camera such that the entire object 158 passes in front of the linescan camera 12 during the image scan. The two relative motions, the spinning of the flat object on the turntable and the linear path of the linescan camera 12 result in the image 162 shown in FIG. 19c. The image 162 has the shape of a surface of a cylinder.

The horizontal lines of the object 158 appear curved in the image 162 due to a constant change of the object's location relative to the camera 12 during the scan. When the linescan camera travels with a constant speed on a linear path, an object's image size in the direction of motion (horizontal dimension) stays fixed regardless of its distance from the camera, as described in U.S. Pat. No. 4,943,821 to Gelphman referenced above. This is referred to as "Fixed X" perspective herein. The vertical dimension appears as expected in a normal, linear perspective due to the physics of lenses—the size of the object diminishes or increases proportionally as the object moves farther away from or closer to the camera. In FIG. 19, the horizontal lines are curved because the object's curvilinear motion produces a constantly changing vertical dimension relative to the camera's linear motion. The once rectangular card, embedded in a flat Euclidean space, thus appears with a different extrinsic geometry, a cylindrical surface, as a result of the relative motions of the rotating square and linear path of the linescan camera 12.

Method to Change the Intrinsic Geometry of an Object Through Relative Motion

Figure 20A:
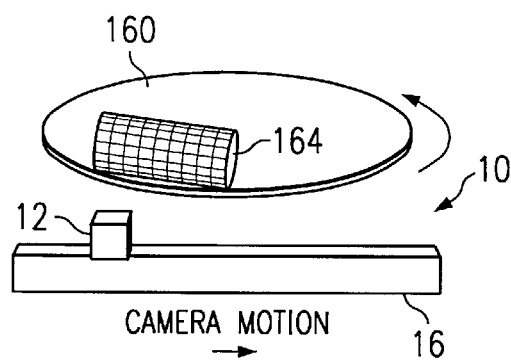
FIGS. 20a and 20b illustrate a method to change the intrinsic property of an object through relative motion.
Figure 20B:
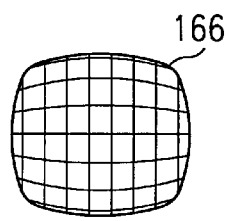

FIGS. 20a–b illustrate the use of relative motion between the linescan camera 12 and an object which changes the intrinsic geometry of an object. In FIG. 20a, a cylinder 164 (open surface) is rotated on turntable 160. The horizontal measurement of the cylinder's curved vertical lines stays fixed, as described above, preserving the vertical lines' curvature. The straight horizontal lines of the cylinder 164 become curved as a result of the object's rotational motion. As seen in FIG. 20b, the resulting image 166 appears as a closed spherical surface. Since a cylinder cannot change into a sphere without deformation of the object, its intrinsic geometry is changed by the scan operation.

Figure 21A:
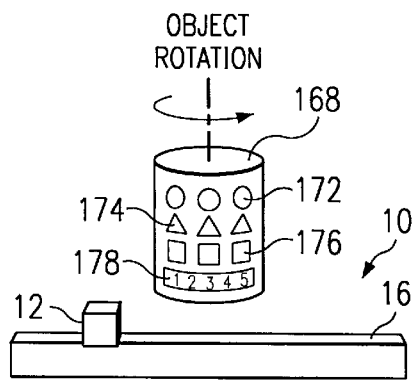
FIGS. 21a and 21b illustrate a method to create an image with two extrinsic geometries.
Figure 21B:
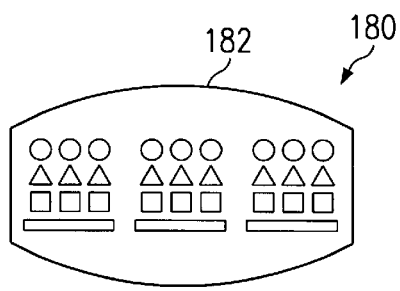

Method to Create an Image With Two Extrinsic Geometries Using Three Relative Motions In FIG. 21a, a cylindrical object 168 (formed of a sheet of paper with circles 170, triangles 172, squares 174 and an eight inch ruler 178) is rotated relative to the linescan camera 12. The rotation rate is much faster than the movement of the camera's velocity and the scan rate is much higher than the camera movement. As shown in FIG. 21b, the resulting image 180 has two extrinsic images. The first extrinsic image is one of a cylinder 182 as the horizontal edges of the paper curve as expected and produce a cylindrical shape embedded in three dimensional Euclidean space. The second extrinsic shape is that of the ruler 178, circles 172, triangles 174 and squares 176, which appear flat and embedded in a planar Euclidean space.

The unique spatial appearance is a result of three relative motions: the rotation of the object 168, the movement of the linescan camera 12 and the camera's scan rate. As the object rotates, the camera remains effectively stationary, while recording an image of the ruler 178, circles 172, triangles 174 and squares 176. Since the camera remains essentially stationary during the recording of the shapes on the cylinder, the view from the camera's line of reference does not change and thus does not record the constant change of direction and location of the rotating vertical dimension. Thus, the appearance of the ruler 178, circles 172, triangles 174 and squares 176 appears flat and planar as one would expect from a rotation of the cylinder 168 with a stationary camera 12. As the scan is completed, the horizontal edges of the cylinder 168 appear curved in the image as shown by cylindrical shape 182. Thus the resulting image has two extrinsic geometries, the planar extrinsic properties of the internal shapes and the cylindrical, three dimensional appearance of the edges of the image.

Figure 22A:
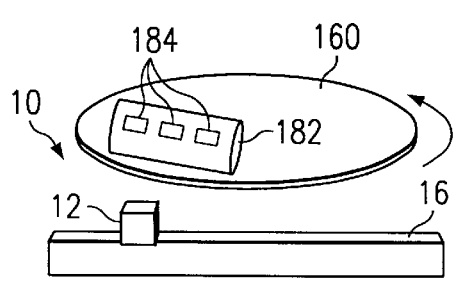
FIGS. 22a and 22b illustrate a method to create an image with two intrinsic geometries.
Figure 22B:
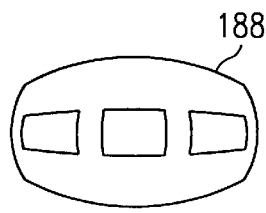

Method to Create an Image With Two Intrinsic Geometries Using Three Relative Motions The intersection of three relative motions with an original object forms an image having two intrinsic geometries. In FIG. 22a, a cylinder 182 formed of a sheet of paper having three squares 184 is rotated lengthwise on the edge of turntable 160. The rotational rate of the turntable is much faster than the movement of the camera's velocity and the scan rate is much higher than the camera movement. This combines the motions of FIG. 20 with the motion of FIG. 21. The resulting image 188, shown in FIG. 22b, has two distinct, intrinsic geometries. The portion of the image 188 created from the edges of the cylinder 182 is an elliptical surface embedded in a non-Euclidean geometry (closed) and the portion of the image created from the squares 184 is a cylindrical surface, embedded in a three dimensional Euclidean geometry (open).

Figure 23A:
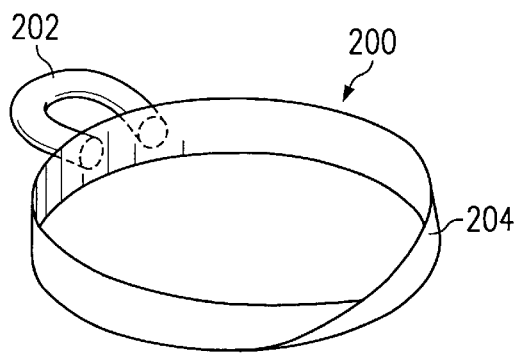
FIGS. 23a, 23b and 23c illustrate a method to create a figure composed of connected sums through relative motion.

Method to Create Figures in an Image that are Connected Sums from Relative Motions FIG. 23a illustrates an example of an object 200 which is the connected sum of a torus 202 and a Mobius strip 204. The procedure in traditional mathematics for creating such a figure is to "cut" a disk out of each sub-object and "glue" the edges together forming a new shape that is the "sum" of the two sub-objects together.

Figure 23B:
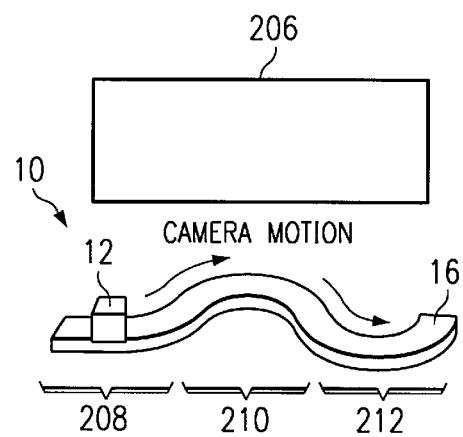
Figure 23C:
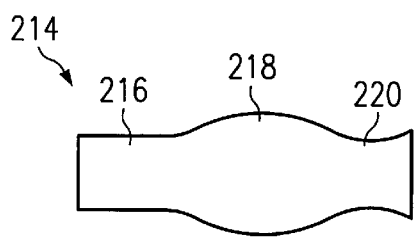

Using the topological panorama camera 10, the geometry of relative motion can create an image with shapes that are the "sum" of the relative motions. In FIG. 23b, an object 206, a flat plane such as a rectangle is scanned in a scan path which starts as a straight path 208 parallel to the objects, then changes to a positive curve path 210 and ends in a negative curve path 212. The resulting image 214 is shown in FIG. 23c, which shows a plane 216, connected to a cylinder 218 connected to a polygon 220 with two hyperbolic edges.

Method to Create an Image Which is a Product of an Object and Relative Motion

Figure 24A:
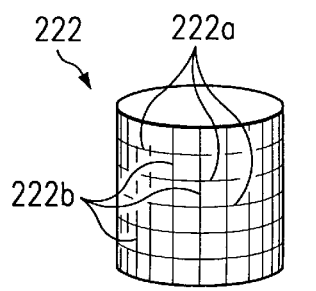
FIGS. 24a, 24b and 24c illustrate a method to create an image which is a product of an object and relative motion.

A cylinder 222 can be defined in traditional geometry as the product of a circle 222a and an interval 222b, as shown in FIG. 24a, where an interval is a line segment with both endpoints included.

Figure 24B:
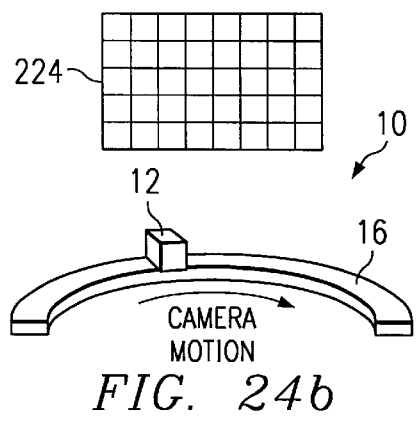
Figure 24C:
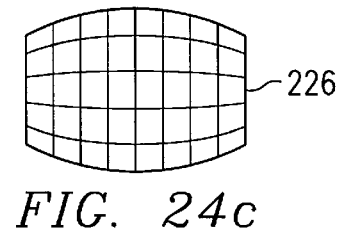

The topological panorama camera 10 can be used to generate a product. As shown in FIG. 24b, a cylindrical image can be produced as the product of an interval, the object 224, and the circular relative motion between the object and the linescan camera 12. The circular motion can be the linescan camera 12 moving while the object remains still, as shown in FIG. 24b, or the object rotating as the linescan camera 12 moves along a linear path (as shown in FIGS. 19a–e), or a combination of both. The resulting image 226 is shown in FIG. 24c.

Method to Compute the Euler's Number For a Surface Using the Geometry of Relative Motion The Euler number for a surface can be determined through relative motion. The Euler number describes the curvature of a surface—Euclidean, elliptical or hyperbolic, in terms of positive curvature (elliptical), zero curvature (Euclidean), or negative curvature (hyperbolic). *Shape of Space, How to Visualize Surfaces and Three Dimensional Manifolds*, by Jeffery Weeks (Marcel Dekker, Inc. 1985), incorporated by reference herein, describes a method of finding the Euler number for a surface in a spatial geometry.

The topological panorama camera 10 can also determine the Euler number of an object's surface using relative motion. The method can find an unknown curvature or Euler number of an objects surface using relative motion between the linescan camera 12 and the object and the curvature found in the resultant image.

Figure 25A:
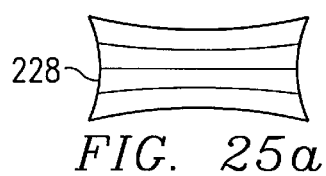
FIGS. 25a, 25b and 25c illustrate a method to determine Euler's number for an unknown object or path using relative motion.
Figure 25B:
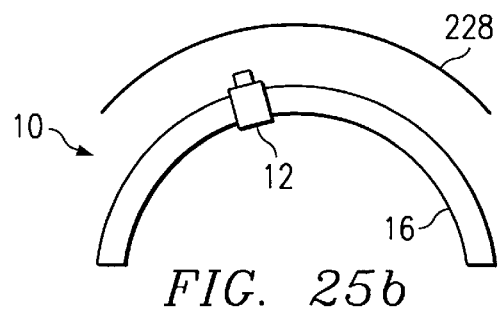
Figure 25C:
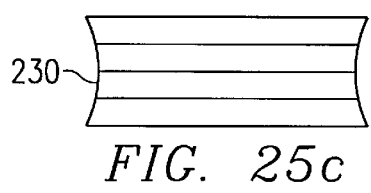
Figure 26A:
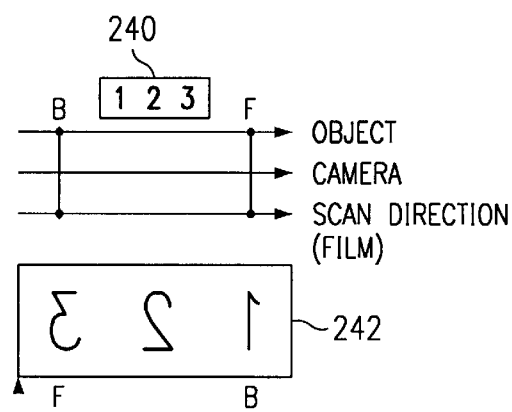
FIGS. 26a through 26f illustrate a method to generate an orientation of an image based on object, camera and scan directions where the object moves faster than the linescan camera.
Figure 26B:
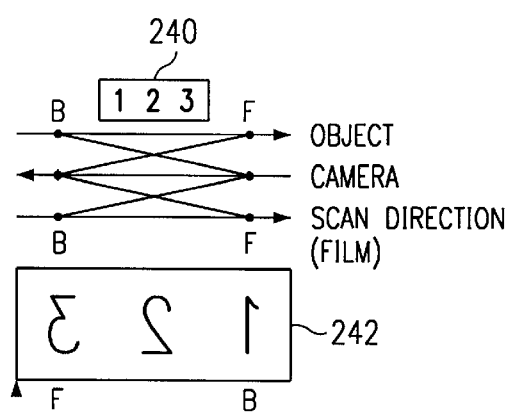
Figure 26C:
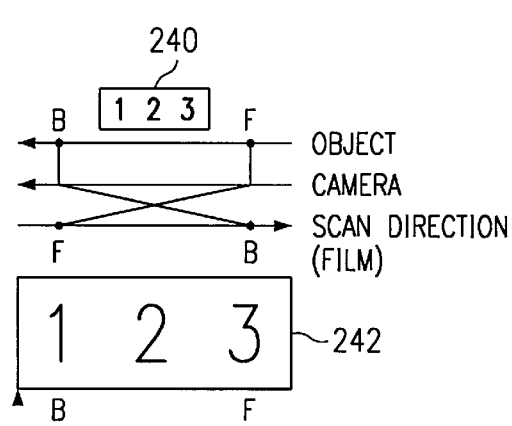
Figure 26D:
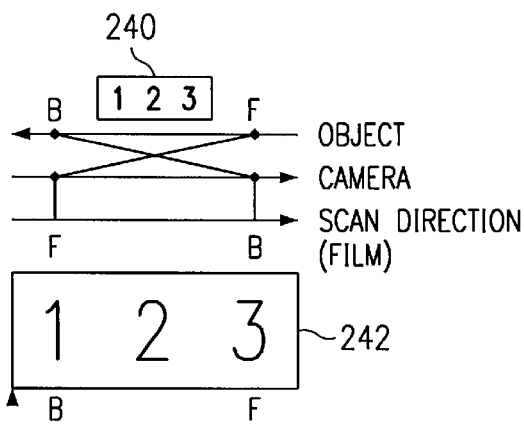
Figure 26E:
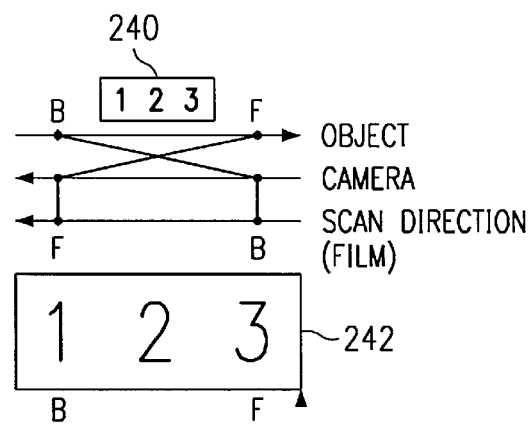
Figure 26F:
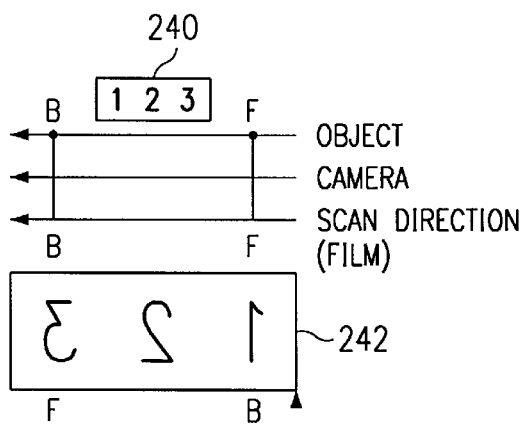
Figure 27A:
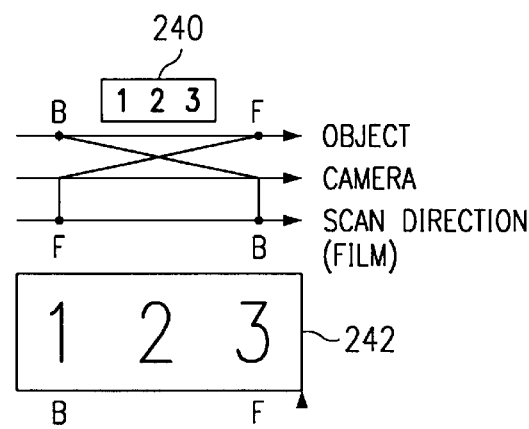
FIGS. 27a through 27f illustrate a method to generate an orientation of an image based on object, camera and scan directions where the object moves slower than the linescan camera.
Figure 27B:
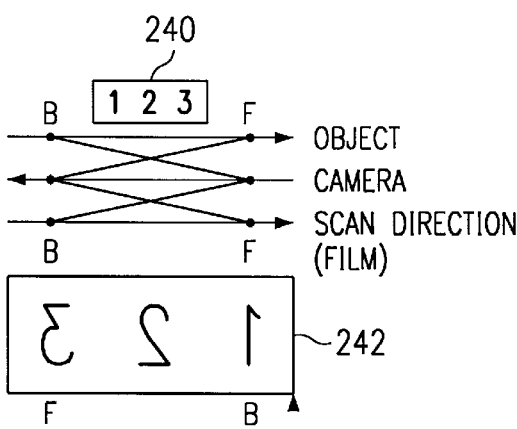
Figure 27C:
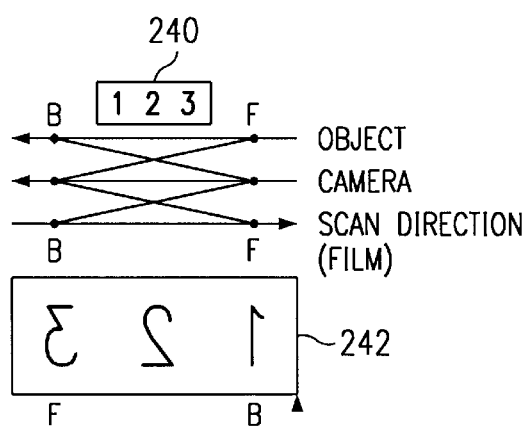
Figure 27D:
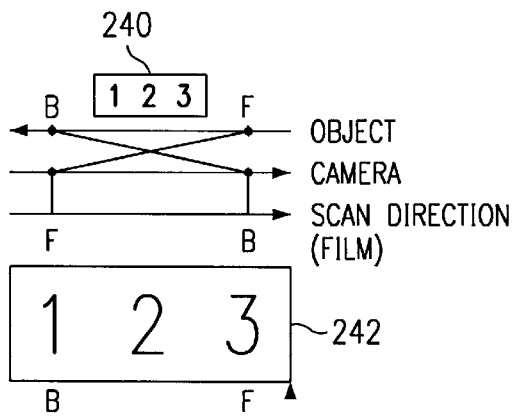
Figure 27E:
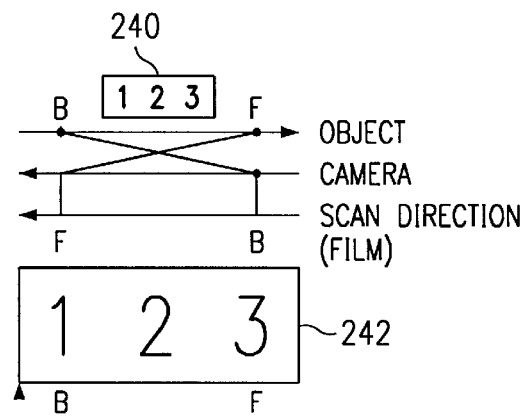
Figure 27F:
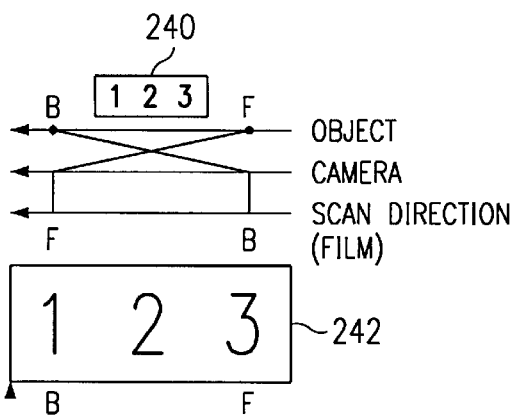

To describe the method of determining Euler's number for an object of unknown shape, a hyperbolic polygon 228 is shown in FIGS. 25a and 25b. In FIG. 25b, the path of the linescan camera 12, which is known, is a positive curve. The resulting image, shown in FIG. 25c, shows flat lines, i.e., a zero curvature. An additive and subtractive relationship exists between the object's surface, the path of the camera, and the resultant image. If the curvature of the surface (−1 in this example) is added to the curvature of the camera's motion (+1 in this example), the result will be the curvature shown in the image. Hence, curvature(image)−curvature (path)=curvature of object. Thus, knowledge of any two curvatures can reveal the unknown curvature. Thus, in the example, the curvature of the object can be derived by the known curvature of the image (0) less the known curvature of the path (+1).

In addition to academic uses, this property can be used in machine vision to recognize shapes and curvatures of surfaces. By knowing the path, the resulting image can be used to determine the curvature of the surface of an object encountered by a robot or other machinery.

Method to Create Different Orientations of an Object in an Image Using Three Relative Motions Orientation is the position of a geometric figure relative to a coordinate system; especially the sense of a directed line. A surface is orientable in the sense that a consistent direction can be given to points of the surface by triangulation. Equivalently, the surface contains no Mobius strip, so that one cannot move a small oriented circle on the surface in such a way that it returns to initial position. A surface, such as a Mobius Strip or Klein bottle, that cannot be given such an orientation, is non-orientable.

In U.S. Pat. No. 4,943,821, referenced above, a method is described to create an image that has a non-orientable surface. In FIGS. 6a–b of that patent, a folded, non-orientable image is created when the camera's path is parallel to the subject and midway through the subject, the film direction changes from forward to reverse. A reverse image is generated by moving the film backwards relative to the camera's motion. Hence, the mirror image of the subject is folded over onto the previously recorded image (normal orientation) and generates a non-orientable surface.

An image with two different orientations can also be generated by the topological panorama camera 10 through the intersection of three relative motions—camera motion, object motion and scan rate motion. FIGS. 26a–f illustrate methods where the object is moving faster than the camera 12 and FIGS. 27a–f illustrate methods where the camera 12 is moving faster than the object.

In FIGS. 26a–f, the object 240 (a flat board with the numbers "123") is moving faster relative to the camera's motion producing different orientations in the images 242. In these Figures, the object and image are labeled F (front) and B (back) as if the front is the front of a car and the back is the back of a car from a side view. Each line represents one relative motion and the arrow represents the direction of motion. For example, in FIG. 26a, the object, camera and "film" (i.e., the scan direction) are all in the same direction. In a left film direction, the image builds from left to right and for a right film direction, the image builds from right to left. The starting side of the image build is indicated by a small triangle on each image 242. Vertical lines and diagonals represent the path of a point from the object to the image.

In FIGS. 26a–f, the object will always appear backward in the image when the object direction and the scan direction are the same. When the object direction and scan direction are opposites, the object will always appear with normal orientation, independent of the camera's direction.

In FIGS. 27a–f, the camera is moving faster than the object's relative motion, producing different orientations in the images. An object will always appear backwards when the camera direction and scan direction are opposites. When the camera direction and scan direction are the same, the object will always appear normal, independent of the object's direction.

Accordingly, one can predict an object's orientation by knowing the relative speeds and directions of the object, camera and film. Changing the scan rate does not change orientation, it only expands or contracts the object's size in the image.

One can also predict an unknown direction of the camera for conditions shown in FIG. 26a–f by inserting a stationary ruler into the scene to be imaged. Inserting a stationary ruler will predict the camera's direction of motion because the stationary ruler will always reflect the relationship between the camera and film—appearing backward or forward according to the scan direction and camera direction. If the camera is moving in an opposite direction as to the object and film, a stationary ruler will appear backwards. However, without additional information, one cannot predict the unknown direction of the object under the conditions of FIGS. 27a–f, because the object's orientation in the image relative to a stationary ruler is not predictive of its direction of motion.

Figure 28A:
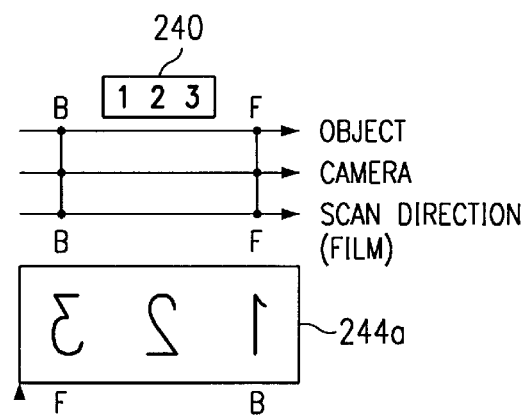
FIGS. 28a and 28b illustrate a method to create a non-orientable surface from an orientable object with relative motion.
Figure 28B:
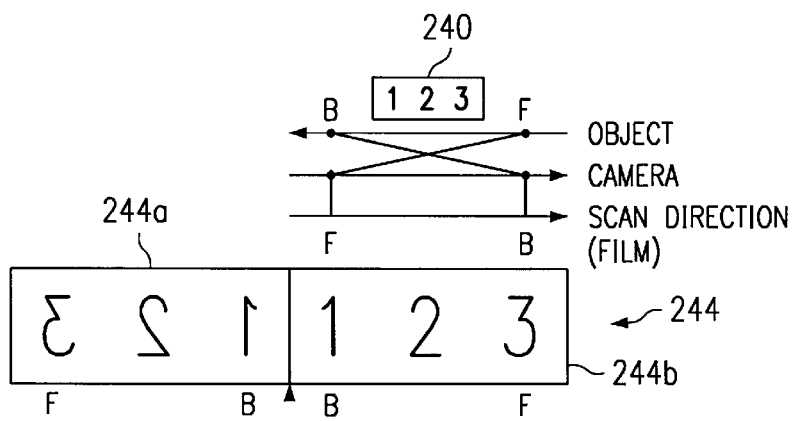

In FIGS. 28a–b, four different relative motions generate a non-orientable surface in the image from an orientable object. In FIG. 28a, which shows the first segment, the object 240 is moving faster than the camera. The object, camera, and scan directions are all to the left, thereby creating segment image 244a of image 244. In FIG. 28b, showing a second segment, the object 240 reverses direction, thereby creating segment image 244b of image 244. The overall image 244, becomes a non-orientable surface.

Figure 29A:
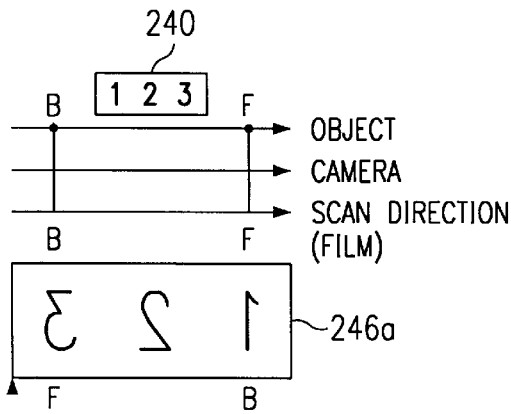
FIGS. 29a and 29b illustrate a method to maintain an orientable surface from an orientable object with relative motion.
Figure 29B:
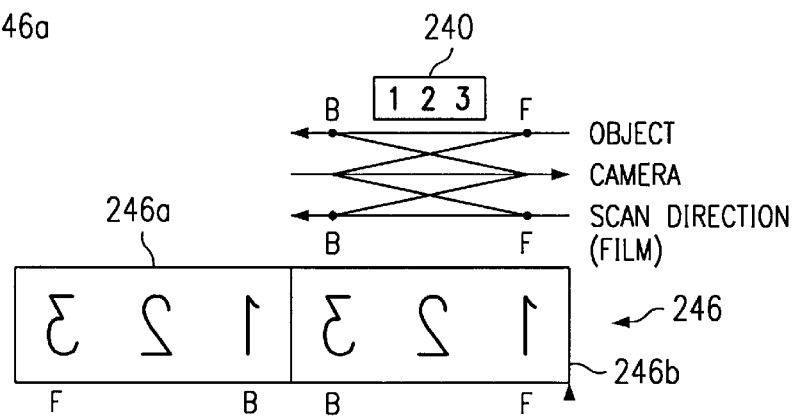

In FIGS. 29a–b, a surface is kept orientable through five relative motions and two changes in direction. In FIG. 29a, which shows the first segment of path motion, the object 240 is moving faster than the camera. The object, camera and scan directions are all to the left, thereby creating segment image 246a of image 246. In FIG. 29b, showing a second segment, the object 240 reverses direction as does the scan direction, thereby creating segment image 246b of image 246. The overall image 246, is an orientable surface.

Figure 30A:
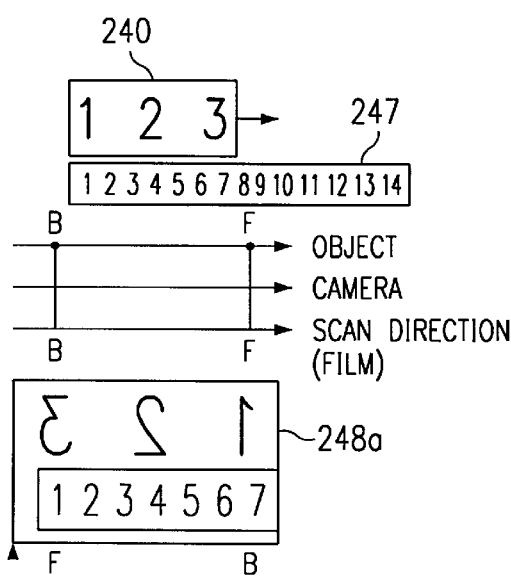
FIGS. 30a and 30b illustrate a method to create an image of one orientable surface and one non-orientable surface.
Figure 30B:
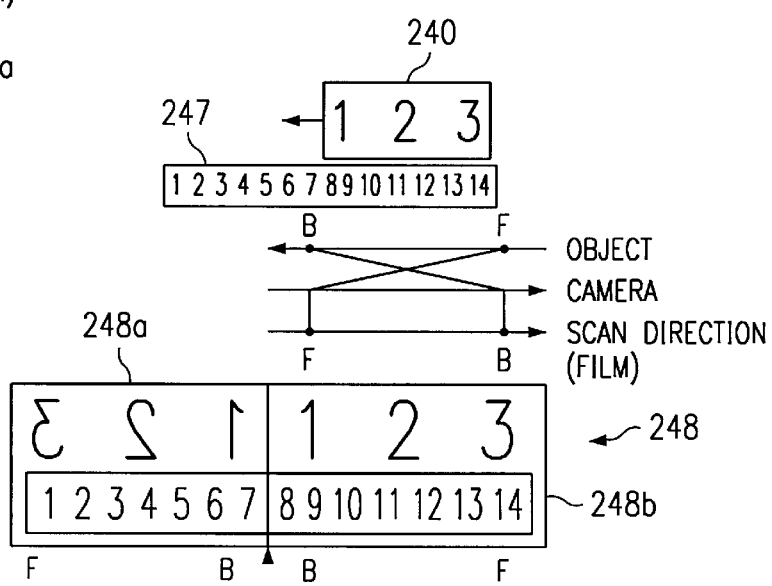

In FIG. 30, a method is shown to create one orientable surface and one non-orientable surface in one image through three relative motions and one change in direction. In FIG. 30a, which shows the first segment of path motion, the object 240 is moving faster than the camera. A stationary ruler is placed below object 240. The object, camera and scan directions are all to the left, thereby creating segment image 248a of image 248. In FIG. 29b, showing a second segment, the object 240 reverses direction, thereby creating segment image 248b of image 248. The overall image 248, has an image of the moving object 240, which is an non-orientable surface, and an image of the ruler, which is an orientable surface.

Method to Create a Physical Representation of a Calculaus Equation

Newton developed Calculus to measure and define motion. He regarded the plane curve as the path traced out by a moving point during an infinitely small interval. He was able to formulate a mathematical method, Calculus, to describe this phenomena. The technique described below illustrates a method, using relative motion and the topological panorama camera 10, to create a physical representation, an image, of a Calculus equation.

Calculus mathematically describes complex motions, geometries of surfaces, and changes in rates of physical processes. A line scan camera's moving line of pixels creates images of complex relative motion geometries, as described above, and rates of change. By employing a line scan camera with relative motion, this method mechanically mimics the essence of Calculus by moving an infinitely small interval (a line rather than a point) through spacetime in a predetermined motion. In essence, both systems, the Calculus and the topological panorama camera 10 and relative motion, describe motion. The latter makes motion visible and measurable. Thus, this technique described herein, can be a very useful tool for students comprehension of the mathematics of calculus.

Figure 31A:
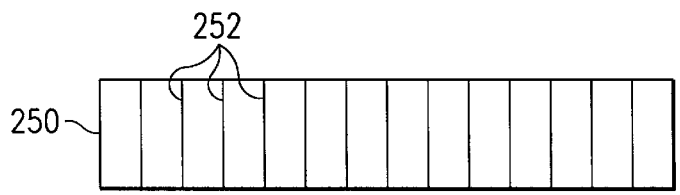
FIGS. 31a through 31d illustrates use of the topological panorama camera to make a visual representation of calculus.
Figure 31B:
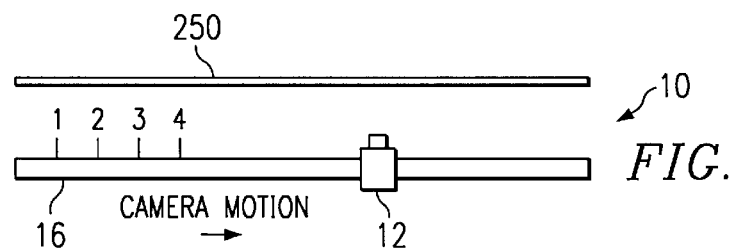
Figure 31C:
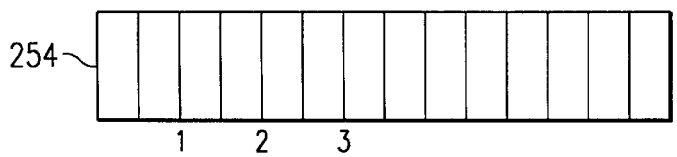
Figure 31D:
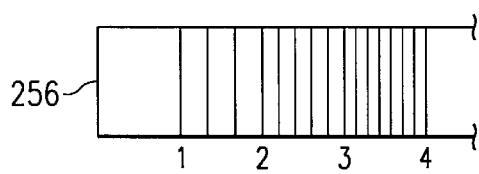

FIG. 31a illustrates a object 250 which is a flat plane with a plurality of evenly spaced vertical lines 252, drawn across its width. In FIG. 31b, the camera 12 moves along track 16 in evenly spaced time intervals to a position specified by a function. Thus, if the function was f(t)=2t, at t=1, the linescan camera 12 would be at position "2", at t=2, the linescan camera would be at position "4", and at t=3, the linescan camera would be at position "6". An image 254 generated using this path is shown in FIG. 31c, which shows evenly spaced vertical lines. Accordingly, it is visually apparent that df(t)/dt equals a constant. Similarly, if the function were f(t)=$t^2$, at t=1, the linescan camera 12 would be at position "1", at t=2, the linescan camera would be at position "4", and at t=3, the linescan camera would be at position "9". An image 256 generated using this path is shown in FIG. 31d, where the vertical lines between regular intervals is increasing. By counting the vertical lines between intervals in the image, the first interval has one line, the second interval has three lines, the third interval has five lines and the fourth interval has seven lines. Accordingly, it can be determined the df(t)/dt is linearly increasing. Consequently, the image from the topological panorama camera 10 is showing a visual representation of the derivative of a function.

Creating a Curved Diagonal By Accelerated Relative Motion

Figure 14A:
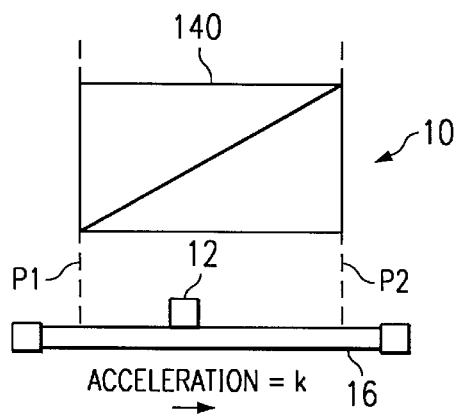
FIGS. 14a and 14b illustrate a method of generating a rectangle with a curved diagonal from a rectangle with a straight diagonal.
Figure 14B:
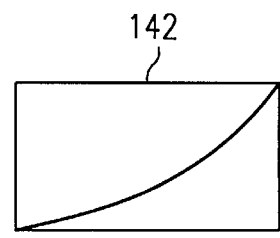

FIGS. 14a–b show an example of creating an image that generates certain diagonal lines of an object to curved lines in the image while maintaining other vertical and horizontal straight lines in the object to straight lines in the image. The object 140 shown in is a square or a rectangle with a diagonal line between two of its corners. The linescan camera 12 travels from P1 to P2 under a constant acceleration. The resulting image 142 maintains the straight sides of the rectangle, but the interior diagonal is curved.

The rectangle in FIG. 14 is situated in a plane parallel to the camera's path. In a Fixed X perspective, the camera's constant speed produces a fixed size in the direction of motion; thus, the x,y coordinates of the diagonal display a linear relationship as shown in FIG. 13. In the x dimension of the diagonal of FIG. 14, the camera's acceleration produces continuously changing intervals. This generates a curved diagonal, the direction of curvature determined by whether the acceleration is positive or negative.

Creating a Calculus Spreadsheet to Predict and Generate Shapes and Figures in the Geometry of Relative Motion An algebraic spreadsheet can be created to describe the intertwined, algebraic relationships between camera functions such as camera speed and direction, image scanning rate and direction, subject distance from the camera, the width of the line from the linescan camera 12, and lens magnification. The spreadsheet enables a user to predict and control image results.

Similarly, students in a calculus classroom can create a calculus-based spreadsheet where the parameters that control the camera and predict an image are accelerations and/or non-linear functions. The calculus spreadsheet enables students to create many of the figures of the geometry of relative motion described above. The following is an example of a topological panorama camera algebraic spreadsheet and its calculus counterpart.

| Algebra | Calculus |
| --- | --- |
| camera travels uniform speed | camera's motion is acceleration and or non-uniform speed |
| camera travels in a line | camera's motion is two dimensional |

-continued

| Algebra | Calculus |
| --- | --- |
| scanning rate is uniform | scanning rate accelerates or is non-uniform |
| subject moves in one direction | subject's motion is two dimensional |
| subject's distance is stationary or linear to the camera | subject's distance is variable and non-uniform to the camera |
| lens magnification is constant | lens magnification is non-constant |

Method to Create A Geometric Image of Sound; What Does Sound Look Like? What Does Motion Sound Like?

The following describes a method to convert sound into an image (geometric image) and translate an image produced by relative motions, into sound. In other words a method to see what sound looks like and hear what motion sounds like.

A topological camera 10 can act as a "translator" of motion to sound and sound to motion. The appearance of an object in an image expands or contracts due to the interaction of relative motions. For example, an image of a square expands horizontally (in the direction of motion) as the camera moves slowly past the object. The square contracts as the camera's motion speeds up. The frequencies of sound operate in much the same way. An object's vibration causes the surrounding medium to alternately expand or compress. Low sounds expand, corresponding to an image created through a slow camera speed, and high sounds compress, corresponding to an image generated through faster camera speeds.

Figure 32A:
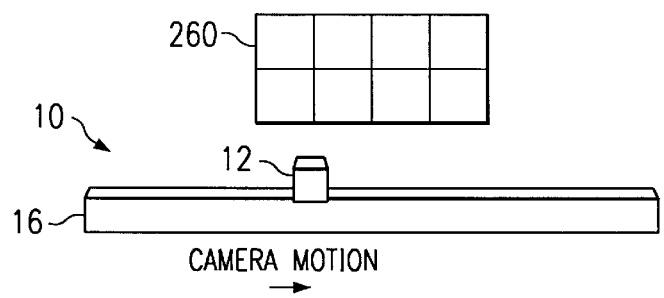
Figure 32B:
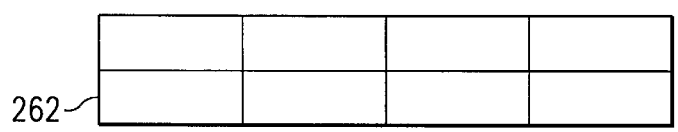
Figure 32C:
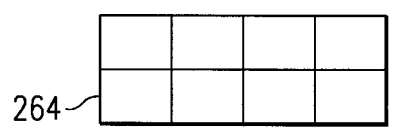

A sound wave can be converted into an image where the frequency of the wave is converted to an assigned camera speed and the desired amplitude is defined by an objects height in an image. (The object's height in an image is a function of lens magnification and its distance from the camera.) A standard unit of measurement or conversion table can be established to "translate" frequencies of sound waves to camera speeds and the varying height of an object to amplitudes. This will enable a student to create an image of sound waves or hear what an image or motion sounds like. For example, generating an image of a grid of squares 260 in a plane parallel to the camera's constant speed as shown in FIG. 32a would produce a sound wave which would correspond to a constant frequency and amplitude. In FIG. 32b, an image 262 is shown where the linescan camera 12 traveled at a first predetermined speed. Changing the speed of the camera would alter the frequency (x dimension, direction of motion). In FIG. 32c, an image 264 is shown where the linescan camera 12 travels as twice the speed as the camera of FIG. 32b. Students could use a tuning fork to hear a first frequency, corresponding to the motion used to create the first image 262, and a second tuning fork to hear a second frequency which is twice the first frequency, corresponding to the motion used to create the second image 264.

Figure 33A:
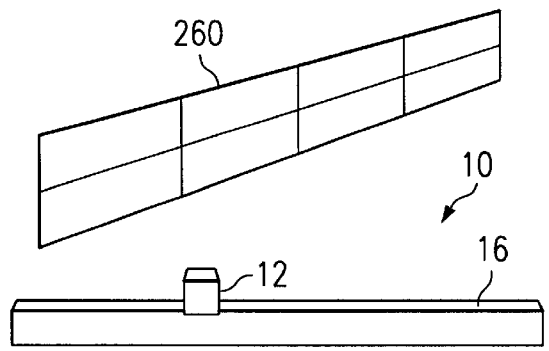
FIGS. 33a and 33b illustrate the use of the topological panorama camera to visualize amplitude of a sound wave.
Figure 33B:
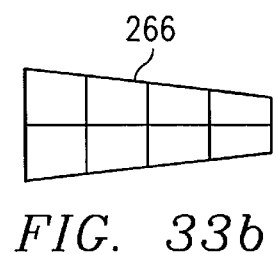

In FIG. 33a, the plane of squares has been placed at an angle to the camera's motion, representing a decrease in amplitude. As shown in the image 266 of FIG. 32b, the camera's constant speed produces a constant frequency, as indicated by the regular interval of vertical lines in the image 266. However, the diminishing height of the boxes of the grid are a result of the change in distance of the object from the camera. The diminishing change in height in the image corresponds to a diminishing amplitude of the sound wave over time.

Figure 34A:
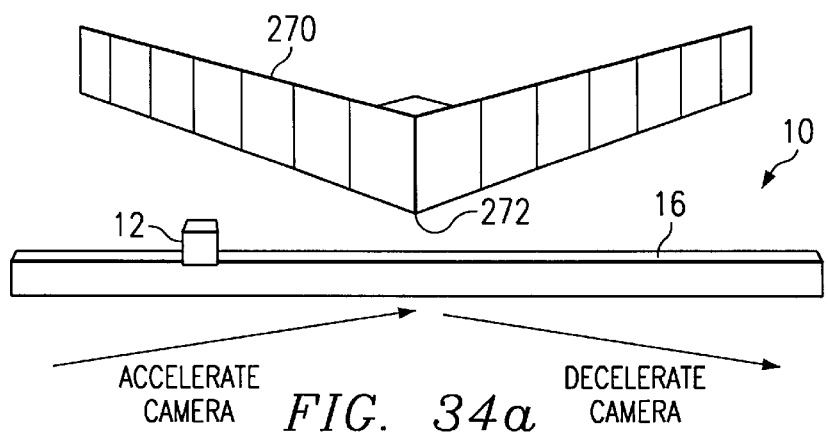
FIGS. 34a and 34b illustrate use of the topological panorama camera to visualize the Doppler effect.
Figure 34B:
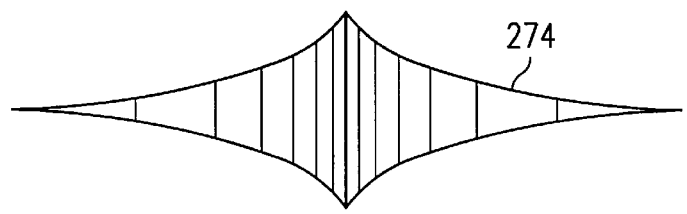

FIGS. 34a–b illustrates a method to generate an image corresponding to the increase and decrease of sound from the Doppler Effect. The object 270 is a grid of squares drawn about a corner 272. The object 272 is placed in front of the linescan camera 12 as shown in the FIG. 34a. The camera's acceleration up to the corner 272 and deceleration after the corner 272 creates an image 274 in FIG. 34b that depicts the change in frequency and amplitude of a Doppler Shift. Students are thus able to see what a Doppler effect sound pattern looks like.

Combining Geometries—Spatial, Coordinate, Computational, and Relative Motion Geometries There are several methods to describe and create geometry that have been invented through time, such as Spatial geometry—described by Euclid (using the logic of proofs), Riemann, Bolyai, Gauss, Einstein and others, Coordinate geometry—described by Descartes (using algebra and a coordinate system, graph), Computational geometry—invented by Seymour Papert and others, described above and the Geometry of Relative Motion—described above.

Some of the geometers use a physical system to create the geometry. Einstein discovered that mass creates the geometry of curved spacetime, Papert invented a computer language to generate his computational geometry, and the geometry of relative motion described herein utilizes a line sensing device and relative motion to create geometries.

Many of these geometries can be combined in various ways to create geometric figures. The method described below combines a coordinate geometry with a spatial and relative motion geometries. (Combinations of spatial and relative motion geometries have been described above extensively).

Students can create graphing geometries with the topological panorama camera 10 and relative motion which are based on methods of coordinate geometry. There is a one to one correspondence between the motion of the camera and the image produced from that motion. Thus, changing variables controlling the camera will change the shape of the graph produced. By measuring and plotting characteristics of the image and/or motion profile (for example time vs. velocity), a student can generate a "geometry" on the graph (angle or slope).

Figure 35A:
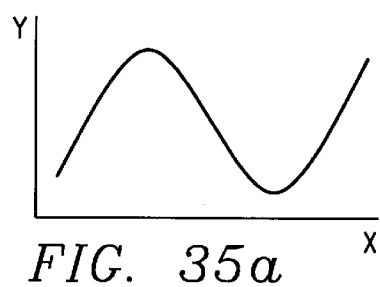
FIGS. 35a and 35b illustrate piecewise linearization of a camera path.

Students can draw a figure on a graph (as shown in FIG. 35a) and predict an expected motion profile and geometry of an image. For example in FIG. 35a, the x,y coordinates of the sinusoidal shape on the graph predicts a spring-like motion of the camera or object.

Method to Use a Graphing Geometry to Create a Non Linear Acceleration

Students creating graphing geometries may find it necessary to produce a motion profile for the camera that includes a non linear acceleration. Producing a non linear acceleration is a difficult task. One way to generate it is to program thousands of pairs of (x,y) coordinates or (x,y,z) coordinates to describe a path of motion. Motion control engineers who encounter a need for a non linear acceleration, such as the motion of a robot arm, have sometimes used a method called piecewise linearization.

Figure 35B:
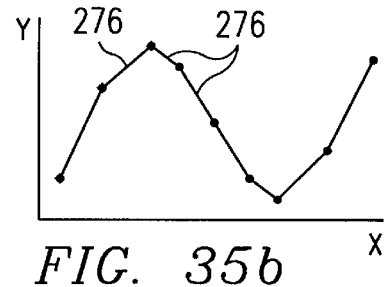

As seen in FIG. 33a, the geometrical graph of the sinusoidal shape predicts a spring-like motion of the camera or subject. To create a non linear motion profile that will create the spring-like motion, the camera's motion is programmed in modules that are pieced together. In fact, each segment 276 of the graph in FIG. 35b represents a specific linear motion profile, with the x-coordinate representing time and the y-coordinate representing a position on a straight track 16. Photographing a grid of squares with the camera moving with a non constant acceleration, will generate an image of various shapes that can be predicted by the linear portions of the graph.

While the method of generating shapes is described above by actual imaging of an object, an alternative to actually recording an image from light reflected off an object to the linescan camera would be to simulate the recording process in a computer wherein the user chooses an object and specifies the respective paths, motions and directions of the object and the topological panorama camera 10. In this case, the computer would need to calculate and form the image which would be received by the linescan camera and produce an image therefrom.

The computer program described above is expected to predict the geometry of a relative motion in classical physics. A method can also be developed to use the computer simulation to predict (map) the spacetime geometry created by relativistic quantum motion.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. A method of teaching a geometry of relative motion, comprising the steps of:

providing an object having a known geometric shape;

identifying a desired shape that can be produced through a continuous sampling of the known shape and relative motion, wherein said desired shape has different extrinsic properties than said geometric shape, or has different intrinsic properties from said geometric shape, or has a different orientation than said geometric shape, or is of a different geometric class than said geometric shape, or is a product of two shapes, or is a sum of two shapes;

generating a prospective image of said desired shape by relative movement between a line sensing recorder and the object in a predetermined path while recording said prospective image.

2. The method of claim 1 and further comprising the step of comparing the prospective image with said desired shape and changing said predetermined path if said prospective image is not substantially the same as said desired shape.

3. The method of claim 1 wherein said generating step comprises the steps of generating a plurality of separate images in a plurality of respective scan paths and combining said separate images to form said prospective image.

4. The method of claim 3 wherein one or more of the separate images overlaps with another image.

5. The method of claim 4 wherein one or more of the images which overlap are added to a previous image to create a multiple exposure image.

6. The method of claim 1 wherein said generating step comprises the step of recording an image using an array of photosensitive electronic cells.

7. The method of claim 1 wherein said generating step comprises the step of recording an image using an array of electronic cells sensitive to infra red light.

8. The method of claim 1 wherein said generating step comprises the step of recording an image using a linescan camera.

9. The method of claim 1 wherein said object has a shape in a first geometric class and said step of recording comprises the step of performing relative motion between the image recorder and said object to generate a shape in a second geometric class.

10. The method of claim 9 wherein said object has a Euclidean shape and the step of recording comprises the step of performing relative motion between said image recorder and said object to generate a non-Euclidean shape.

11. The method of claim 1 wherein said object is a Euclidean shape step of generating an image comprises the step of performing relative motion between said image recorder and said object to generate a topological shape.

12. The method of claim 1 wherein said object contains diagonal line segments and said step of generating an image comprises the step of accelerating said image recorder and said object relative to one another.

13. The method of claim 1 wherein said step of generating an image comprises the step of rotating said object relative to said image recorder.

14. The method of claim 1 wherein said step of generating an image comprises the step of performing relative motion between said image recorder and said object to create a straight path between said image recorder and said object.

15. The method of claim 1 wherein said step of generating an image comprises the step of performing relative motion between said image recorder and said object to create a curved path between said image recorder and said object.

16. The method of claim 1 and further comprising the step of analyzing the prospective image to determine information about the object.

17. The method of claim 1 wherein said generating step comprises the steps of generating said prospective image using a plurality of path segments each having a respective motion profile.

18. The method of claim 17 wherein said step of generating a prospective image using a plurality of path segments comprises the step of generating said prospective image using path segments having different linear profiles, such that a prospective image with a non-linear profile is produced.

19. The method of claim 1 and further comprising the step of generating Euler's number for the object based on the image.

20. The method of claim 1 wherein said desired shape is the product of two shapes.

21. The method of claim 1 wherein said desired shape is the sum of two shapes.

22. The method of claim 1 wherein said step of generating a prospective image comprises the step of generating an image with a non-Euclidean geometry.

23. The method of claim 1 wherein said step of generating a prospective image comprises the step of generating an image with an extrinsic geometry which differs from an intrinsic property of the object.

24. The method of claim 1 wherein said step of generating a prospective image comprises the step of generating an image with an intrinsic geometry which differs from an intrinsic property of the object.

25. The method of claim 1 wherein said generating step comprises the step of generating a prospective image of said desired shape by computer simulation of relative movement between a line sensing recorder and the object in a predetermined path while recording said prospective image.

26. The method of claim 1 and further comprising the step of analyzing the prospective image to determine information about the object.

27. The method of claim 1 wherein said generating step comprises the steps of generating said prospective image using a plurality of path segments each having a respective motion profile.

28. A method of translating a frequency and amplitude of a sound to an image, comprising the steps of:

providing an object of known shape;

providing frequency and amplitude information describing a sound wave;

generating an image representing the sound wave by relative movement between a line sensing recorder and the object in a predetermined path defined by said frequency and amplitude information.

29. The method of claim 28 wherein said step of providing frequency and amplitude information comprises the steps of providing one or more conversion tables for relating frequencies to image widths and a second conversion table for relating amplitudes to image heights.

30. The method of claim 28 wherein said generating step includes the step of generating a relative movement between said object at a motion profile defining a speed of relative motion and a scan rate for the line sensing recorder.

31. The method of claim 28 wherein said generating step includes the step of generating a movement between said object and said line sensing recorder such that the distance between said object and said line sensing recorder is based on said amplitude information.

32. The method of claim 29 wherein said generating step includes the step of generating a relative movement between said object and said line sensing recorder at a speed and scan rate based on an desired image width.

33. The method of claim 29 wherein said generating step includes the step of generating a relative movement between said object and said line sensing recorder at a distance based on an desired image height.

34. A method of translating an image to a sound wave, wherein said image is representative of a known object being scanned using a line sensing recorder, comprising the steps of:
providing one or more conversion tables relating the width of an object in the image to a frequency and the height of an object with a amplitude;
measuring a width and height object from the image;
translating the width and height to a frequency and amplitude for the sound wave.

35. The method of claim 34 and further comprising the step of generating an audible sound wave at said frequency and amplitude.

36. The method of claim 34 and further comprising the step identifying a scan rate and speed of relative motion related to a frequency.

37. The method of claim 34 and further comprising the step of identifying a distance between the line scanning recorder and the object related to an amplitude.

38. The method of claim 34 and further comprising the step of generating a second image responsive to said frequency and amplitude.

39. A method of deriving information about an object using a line sensing recorder, comprising the steps of:
recording an image of a relative motion between the object and a line sensing recorder using known operating parameters;
identifying image characteristics which indicate a characteristic of the object; and
deriving one or more of the characteristics shape, surface or motion of the object from the image by reference to the image and the operating parameters.

40. The method of claim 39 wherein said deriving step comprises the step of deriving that the object has a Euclidean shape.

41. The method of claim 39 wherein said deriving step comprises the step of deriving that the object has a non-Euclidean shape.

42. The method of claim 39 wherein said deriving step comprises the step of deriving that the object has a topological shape.

43. The method of claim 39 wherein said deriving step comprises the step of deriving extrinsic properties of the object.

44. The method of claim 39 wherein said deriving step comprises the step of deriving intrinsic properties of the object.

45. The method of claim 39 wherein said recording step comprises the step of accelerating said line sensing recorder relative to said object.

46. The method of claim 45 wherein said acceleration is non-linear.

47. The method of claim 39 wherein said recording step comprises the step of rotating said object relative to said line sensing recorder.

48. The method of claim 39 wherein said recording step comprises the step of moving the line sensing recorder on a curved path relative to said object.

49. The method of claim 39 wherein said recording step comprises the step of moving the line sensing recorder in a three dimensional path relative to said object.

50. The method of claim 39 wherein said step of recording an image includes the step of generating a plurality of separate sub-images are combined to form the image.

51. The method of claim 39 wherein said sub-images overlap.

52. The method of claim 39 wherein said step of recording an image comprises the steps of generating said image using a plurality of path segments each having a respective motion profile.

53. The method of claim 39 wherein said sub-images form a multiple exposure image.

54. The method of claim 39 wherein said analyzing step comprises the step of deriving Euler's number for the object.

55. The method of claim 39 wherein said analyzing step comprises the step of determining an orientation of the image to determine information about the path of the object.

56. A method of teaching a geometry of relative motion, comprising the steps of:
providing an object having a known geometric shape;
identifying a desired shape that can be produced through a continuous sampling of the known shape and relative motion;
generating a prospective image of said desired shape by relative movement between a line sensing recorder and the object in a predetermined path while recording said prospective image, such that the relative movement between the line sensing recorder and the object causes a transformation which changes the extrinsic properties of said geometric shape, or changes the intrinsic properties of said geometric shape, or changes the orientation of said geometric shape, or creates a sum or two shapes, or creates a product of two shapes, or the mapping is a non-Euclidean mapping or is a Euclidean mapping.

57. The method of claim 56 and further comprising the step of comparing the prospective image with said desired shape and changing said predetermined path if said prospective image is not substantially the same as said desired shape.

58. The method of claim 56 wherein said generating step comprises the step of recording an image using an array of photosensitive electronic cells.

59. The method of claim 56 wherein said generating step comprises the step of moving said camera in a three dimensional path.

60. The method of claim 56 wherein said generating step comprises the step of moving said object while the camera remains in a fixed position.

61. The method of claim 56 wherein said generating step comprises the step of moving said object and the camera while the prospective image is recorded.

62. A method of teaching geometry, comprising the steps of:

receiving image lines to be combined to form an image in a line sensing image recorder;

moving said object and said line sensing image recorder while said line sensing image recorder is receiving said image lines; and generating an image of said object from said image lines.

63. The method of claim 62 wherein said moving step includes the step of rotating said object.

64. The method of claim 62 wherein said moving step includes the step of moving said object along a line.

65. An imaging apparatus for generating an image of an object comprising:

a line sensing image recorder for receiving image lines to be combined to form an image;

movement apparatus for moving said line sensing image recorder in a three dimensional path about said object while said line sensing image recorder is receiving said image lines; and a computer for controlling said movement apparatus responsive to user selected criteria.

66. The imaging apparatus of claim 65 wherein said line sensing image recorder is an electronic line sensing image recorder.

67. The imaging apparatus of claim 66 wherein said electronic line sensing image recorder is a line scan camera.

68. The imaging apparatus of claim 66 wherein said computer receives image data from said electronic line sensing image recorder.

69. The imaging apparatus of claim 65 wherein said line sensing image recorder is a film based image recorder.

70. The imaging apparatus of claim 65 wherein said movement apparatus comprises a first track for controlling movement of the line sensing image recorder in a first direction, a second track for controlling movement of the line sensing image recorder in a second direction, and a third track for controlling movement of the line sensing image recorder in a third direction.

71. The imaging apparatus of claim 70 wherein said first, second and third directions are orthogonal to each other.

72. The imaging apparatus of claim 65 wherein the line sensing image recorder is coupled to the movement apparatus with a jointed connection.

73. The imaging apparatus of claim 72 wherein said jointed connection is a robotic joint which allows pitch, tilt and roll of said line sensing image recorder relative to said movement apparatus as said line sensing image recorder is receiving lines.

74. A method of generating an image comprising the steps of:

receiving image lines to be combined to form an image with a line sensing image recorder;

moving the line sensing image recorder in a three dimensional path about said object while said line sensing image recorder is receiving said image lines; and controlling movement of said line sensing image recorder responsive to user selected criteria.

75. The method of claim 74 wherein said moving step comprises moving said line sensing recorder along a first track for controlling movement of the line sensing image recorder in a first direction, moving said line sensing recorder along a second track for controlling movement of the line sensing image recorder in a second direction and moving said line sensing recorder along a third track for controlling movement of the line sensing image recorder in a third direction.

76. The method of claim 75 wherein said first, second and third directions are orthogonal to each other.

77. The method of claim 74 wherein said movement step further comprises the step of providing pitch, tilt and roll of said line sensing image recorder.

* * * * *